United States Patent
Vallikannu et al.

(10) Patent No.: US 10,330,335 B2
(45) Date of Patent: Jun. 25, 2019

(54) METHOD AND SYSTEM FOR DETECTING AN OPERATIONAL MODE OF A BUILDING CONTROL COMPONENT

(71) Applicant: Honeywell International Inc., Morris Plains, NJ (US)

(72) Inventors: Appar Vallikannu, Bangalore (IN); Raman Subramaniam, Aruppukottai (IN); Janaki Krishnaswamy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 390 days.

(21) Appl. No.: 15/012,699

(22) Filed: Feb. 1, 2016

(65) Prior Publication Data

US 2016/0178225 A1    Jun. 23, 2016

Related U.S. Application Data

(63) Continuation-in-part of application No. 14/766,119, filed as application No. PCT/US2013/025168 on Feb. 7, 2013.

(51) Int. Cl.
  *F24F 11/00* (2018.01)
  *G05B 15/02* (2006.01)
  (Continued)

(52) U.S. Cl.
  CPC ............. *F24F 11/30* (2018.01); *F24F 11/62* (2018.01); *G05B 15/02* (2013.01); *F24F 11/46* (2018.01);
  (Continued)

(58) Field of Classification Search
  CPC ............. F24F 11/006; F24F 2011/0061; F24F 2011/0063; F24F 2011/0068;
  (Continued)

(56) References Cited

U.S. PATENT DOCUMENTS

| 3,602,703 A | 8/1971 | Polenz |
| 4,418,333 A | 11/1983 | Schwarzbach et al. |

(Continued)

FOREIGN PATENT DOCUMENTS

| EP | 2336834 | 6/2011 |
| JP | 200099945 | 10/2000 |
| WO | WO 99/43068 | 8/1999 |

OTHER PUBLICATIONS

ZigBee Wikipedia Article, downloaded from Wikipedia, Feb. 14, 2012.

(Continued)

*Primary Examiner* — Kenneth M Lo
*Assistant Examiner* — Mohammad A Rahman
(74) *Attorney, Agent, or Firm* — Seager, Tufte & Wickhem LLP

(57) ABSTRACT

This disclosure relates to methods, systems, and devices for detecting an operational mode of a building component of an environmental control system. In some instances, the apparatus may include a sensor for outputting a signal related to a measure of power drawn by the building component. The sensor may be a current sensor associated with a power cord of an air conditioning unit. The signal output by the sensor may be received by a signal conditioning circuit for conditioning the signal received from the sensor such as, for example, by amplifying and/or filtering. A comparator may be configured to compare the conditioned signal to a specified threshold associated with an ON condition and/or an OFF condition of the building component. The apparatus may include a wireless interface configured to wirelessly transmit a determination of whether the building component is ON or OFF based on the result determined by the comparator.

20 Claims, 13 Drawing Sheets

(51) Int. Cl.
*F24F 11/30* (2018.01)
*F24F 11/62* (2018.01)
*F24F 11/63* (2018.01)
*F24F 11/64* (2018.01)
*F24F 11/56* (2018.01)
*F24F 11/58* (2018.01)
*F24F 11/46* (2018.01)

(52) U.S. Cl.
CPC ............. *F24F 11/56* (2018.01); *F24F 11/58* (2018.01); *F24F 11/63* (2018.01); *F24F 11/64* (2018.01); *G05B 2219/2639* (2013.01)

(58) Field of Classification Search
CPC ...... F24F 2011/0071; F24F 2011/0075; G05B 15/02; G05B 2219/2639
See application file for complete search history.

(56) References Cited

U.S. PATENT DOCUMENTS

| | | | |
|---|---|---|---|
| 4,644,320 A | 2/1987 | Carr et al. | |
| 5,097,249 A | 3/1992 | Yamamoto | |
| 5,193,292 A | 3/1993 | Hart et al. | |
| 5,690,063 A * | 11/1997 | Motoyama | F02D 37/02 123/73 A |
| 5,706,191 A | 1/1998 | Bassett et al. | |
| 6,108,685 A | 8/2000 | Kutzik et al. | |
| 6,112,127 A | 8/2000 | Bennett | |
| 6,301,912 B1 * | 10/2001 | Terai | F04C 23/008 418/55.5 |
| 6,513,086 B1 * | 1/2003 | Haddad | G06F 1/183 361/191 |
| 6,727,816 B1 | 4/2004 | Helgeson | |
| 6,853,291 B1 | 2/2005 | Aisa | |
| 6,891,478 B2 | 5/2005 | Gardner | |
| 6,901,066 B1 | 5/2005 | Helgeson | |
| 6,934,962 B2 | 8/2005 | Sharood et al. | |
| 6,967,575 B1 | 11/2005 | Lingemann | |
| 7,015,789 B1 | 3/2006 | Helgeson | |
| 7,142,112 B2 | 11/2006 | Buckingham et al. | |
| 7,423,546 B1 | 9/2008 | Aisa | |
| 7,446,647 B2 | 11/2008 | Helgeson | |
| 7,471,942 B2 | 12/2008 | Subramanian et al. | |
| 7,565,225 B2 | 7/2009 | Dushane et al. | |
| 7,636,042 B2 | 12/2009 | Hameed | |
| 7,639,907 B2 | 12/2009 | Elberbaum | |
| 7,643,908 B2 | 1/2010 | Quirino et al. | |
| 7,831,339 B2 | 11/2010 | Kim et al. | |
| 8,102,799 B2 | 1/2012 | Alexamder et al. | |
| 9,741,023 B2 * | 8/2017 | Arensmeier | F24F 11/0086 |
| 2001/0025349 A1 * | 9/2001 | Sharood | G06Q 30/0235 713/340 |
| 2002/0161558 A1 * | 10/2002 | Georges | G08C 17/00 702/188 |
| 2007/0200004 A1 * | 8/2007 | Kasper | F24F 11/006 236/44 C |
| 2008/0054083 A1 | 3/2008 | Evans | |
| 2009/0251127 A1 * | 10/2009 | Kim | G01R 22/063 324/76.11 |
| 2011/0061014 A1 | 3/2011 | Frader-Thompson et al. | |
| 2011/0063126 A1 | 3/2011 | Kennedy et al. | |
| 2011/0125328 A1 | 5/2011 | Lingrey et al. | |
| 2011/0181412 A1 | 7/2011 | Alexander et al. | |
| 2012/0191254 A1 * | 7/2012 | Cho | F24F 11/006 700/276 |
| 2013/0159157 A1 * | 6/2013 | Greene | G06Q 10/04 705/37 |
| 2013/0214598 A1 * | 8/2013 | Burke | G05B 15/02 307/31 |
| 2015/0369505 A1 | 12/2015 | Malve et al. | |

OTHER PUBLICATIONS

U.S. Appl. No. 15/012,660, filed Feb. 1, 2016.
U.S. Appl. No. 15/012,622, filed Feb. 1, 2016.
U.S. Appl. No. 15/012,586, filed Feb. 1, 2016.

* cited by examiner

METHOD AND SYSTEM FOR DETECTING AN OPERATIONAL MODE OF A BUILDING CONTROL COMPONENT

This is a continuation-in-part of co-pending U.S. patent application Ser. No. 14/766,119, filed Aug. 5, 2015, entitled "BUILDING CONTROL SYSTEM WITH DISTRIBUTED CONTROL", which is a National Stage of International Application No. PCT/US13/25168, filed Feb. 7, 2013, entitled "BUILDING CONTROL SYSTEM WITH DISTRIBUTED CONTROL", both of which are incorporated herein by reference.

TECHNICAL FIELD

The present disclosure generally relates to building management systems, and more particularly, to methods, systems, and devices for managing energy consuming units such as discrete air conditioner units in a building such as a multi-room or multi-zone building.

BACKGROUND

In many developing economic regions such as China, India, and Brazil, smaller commercial and residential buildings often employ discrete air conditioner units, sometimes referred as split air conditioner units, to control the environmental conditions within the building. Larger buildings may have multiple discrete air conditioner units located in different spaces or zones within the building. These discrete air conditioner units are often mounted in a wall, window, or ceiling of the building. The discrete air conditioner units are typically manually controlled by the user, sometimes with the aid of an RF remote control device. However, having individual users manually control the various discrete air conditioner units in a building can be energy inefficient, particularly when the users do not turn the air conditioner units to a more energy efficient setting when the building or zone is unoccupied.

SUMMARY

The present disclosure generally relates to building management systems, and more particularly, to methods, systems, and devices for managing energy consuming units such as discrete air conditioner units in a building such as a multi-room or multi-zone building. In such systems, it can be desirable to send out one or more control commands in order to change an operational mode of a building component such as an air conditioner unit, and to confirm that the building component received the one or more control commands and is operating in accordance with the desired operating mode.

In one illustrative embodiment, an operational mode sensor may be configured for detecting an operational mode of a building component of an environmental control system. In some cases, the operational mode sensor may be used to sense an operational mode of a discrete air conditioner unit or other building component. In some cases, the operational mode sensor may include a sensor for outputting a signal that is related to a measure of power drawn by the building component. The sensed signal may be provided to a signal conditioning circuit coupled to the sensor. The signal conditioning circuit may be configured to condition the signal received from the sensor. A comparator may be coupled to the signal conditioning circuit and may be configured for comparing the conditioned signal to a specified threshold associated with, for example, an ON condition of the building component. The operational mode sensor may include a wireless interface configured to wirelessly transmit a determination of whether the building component is currently ON or OFF based on the result determined by the comparator.

Another illustrative embodiment may include a building control system for controlling one or more building components located within a building. The system may include one or more discrete air conditioner units, or other building components, coupled to a power source, one or more controllers and a sensor configured to determine an operational mode of the one or more of the discrete air conditioner units and/or building components. The discrete air conditioner units may be controlled by one or more discrete air conditioner controllers that are configured to communicate with and control the discrete air conditioner units via a first wireless communications path. The air conditioner controller may be configured to send out one or more commands to the one or more discrete air conditioner units via the first wireless communication path.

The building control system may include an operational mode sensor associated with a discrete air conditioner unit. The operational mode sensor may be configured to detect an operational mode of the discrete air conditioner unit. The operational mode sensor may include, for example, a sensor for outputting a signal related to a measure of power drawn by the building component. The sensed signal may be provided to a signal conditioning circuit coupled to the sensor. The signal conditioning circuit may be configured for conditioning the signal received from the sensor. A comparator may be coupled to the signal conditioning circuit and may be configured for comparing the conditioned signal to a specified threshold associated with an ON condition (or other condition) of the building component. The operational mode sensor may include a wireless interface that is configured to wirelessly transmit a determination of whether the building component is ON or OFF based on the result determined by the comparator.

An illustrative method for confirming that one or more commands that were wirelessly sent to a building component of a building were actually received and implemented by the building component may include wirelessly sending one or more commands to the building component, where the one or more commands are configured to change an operational mode of the building component to a predetermined operational mode. Once the one or more commands are sent, a measure of power consumed by the building component is sensed and compared to a specified threshold. Based on the comparison, it is determined if the building component is in the predetermined operational mode. Once this determination is made, one or more messages that indicate if the building component is in the predetermined operational mode is wireless transmitted, which then confirms that the one or more commands were received and implemented by the building component.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments in connection with the accompanying drawings, in which.

Figure 1:
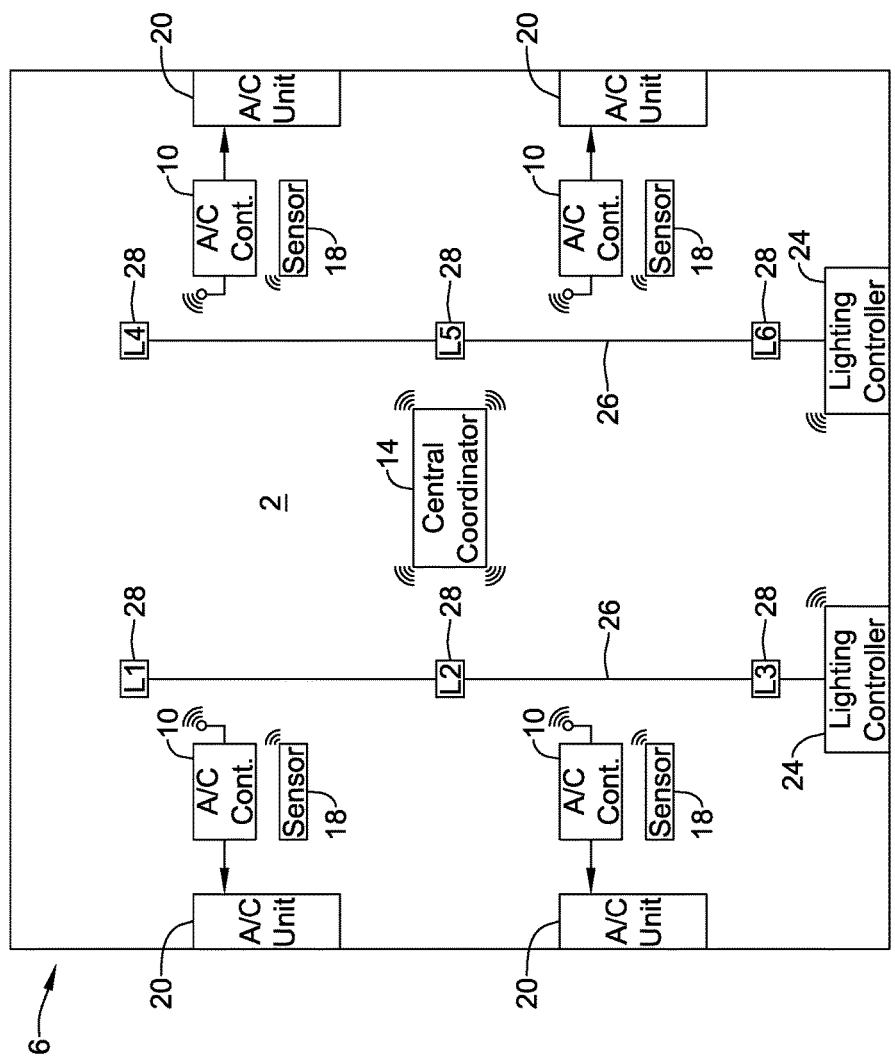
FIG. 1 is a schematic view of an illustrative building management system for controlling one or more building components servicing the building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature. Additionally, while the embodiments described herein generally relate to controlling one or more discrete air conditioner units servicing a building, these are just some examples. It will be understood by those of skill in the art that systems, methods, and devices, as described herein, may be adapted and expanded to communicate with and control other building components that may be used to service a building. Centralizing and coordinating control of multiple building components servicing a building may reduce operating costs and increase overall energy efficiency of a building.

FIG. 1 is a schematic view of a building or structure 6 including an illustrative building management system 2 for controlling one or more building components servicing the building or structure 6. The building management system 2, as described herein according to the various illustrative embodiments, may be used to control environmental conditions and/or lighting in buildings such as, for example, retail stores, commercial offices, hospitals, clinics, restaurants, single family dwellings, hotels, multi-tenant buildings, and/or multi-use facilities. These are just some examples. It will be generally understood that the building management system 2 may be expanded and adapted to control and manage other systems and building components, and may be deployed on a larger scale as the need arises. In addition, the building management system 2, as described herein, may provide a wireless retrofit solution for facilities employing older building components that may be wired and that are currently incapable of receiving a wireless or digital command signal. For example, the building management system 2 may be configured to coordinate operational control of multiple building components servicing the building or structure 6 that otherwise operate independently of one another. This may increase operational efficiency, reduce operational costs and maximize energy efficiency of the building or structure 2 in which the building management system is deployed.

The illustrative building management system 2 shown in FIG. 1 includes one or more discrete air conditioner controllers 10, a central coordinator 14, and one or more sensors 18. The building management system 2 may be used to communicate with and control one or more discrete air conditioner units 20, and/or one or more lighting controllers 24 for controlling a lighting bank 26 having at least one light unit 28 servicing the building or structure 6. In a simplified embodiment, the building management system 2 may be used to control a single discrete air conditioner unit 20 and/or a single lighting controller 24 controlling at least one light unit 28. In other embodiments, the building management system 2 may be used to communicate with and control multiple discrete air conditioner units 20 and/or multiple lighting controllers 24. The discrete air conditioner units 20 may be located in different zones or rooms of the building and may be mounted, for example, on a wall, ceiling, or window of the building or structure 6. Both the discrete air conditioner units 20 and the lighting controllers 24 may be powered by line voltage, and may be powered by the same or different electrical circuit. While FIG. 1 shows four discrete air conditioner units 20, and two lighting controllers 24 for controlling two lighting banks 26 each having at least one light unit 28, it is contemplated that the building management system 2 may be used to control other suitable building components that may be used to service the building or structure 6.

The central coordinator 14 may be configured to control the comfort level in one or more rooms and/or zones of the building or structure 6 by activating and/or deactivating one or more discrete air conditioner units 20 in a controlled manner. Alternatively, or in addition, the central coordinator 14 may be configured to control the lighting in one or more rooms and/or zones of the building or structure by activating and/or deactivating the lighting controllers 24 to operate the lighting banks 26 in a controlled manner. In some cases, the central coordinator 14 may be configured to transmit a command over a wired or wireless network to a discrete air conditioner controller 10 for operating a discrete air conditioner unit 20. Each discrete air conditioner controller 10 may be located near or in close proximity to the discrete air conditioner unit 20 that it controls. In some cases, as will be described herein in greater detail, a discrete air conditioner controller 10 may be configured to control two or more discrete air conditioner units 20. The discrete air conditioner controller 10 is configured to transmit a command signal to its corresponding discrete air conditioner unit 20 for activating or deactivating the discrete air conditioner unit 20 in a desired manner. In some cases, the air conditioner controller 10 may be configured to receive a command from the central coordinator 14 in a first signal format, and to transmit a corresponding command signal to the discrete air conditioner unit 20 in a second signal format that the discrete air conditioner unit 20 is configured to receive. In many cases, the first signal format transmitted by the central coordinator 14 is different from the second signal format received by the discrete air conditioner unit 20.

In some instances, the central coordinator 14 may be configured to receive a signal from one or more sensors 18 located throughout the building or structure 6. In some cases, one or more sensors 18 may be integrated with and form a part of one or more of the discrete air conditioner controllers 10 located throughout the building or structure 6. In other cases, one or more sensors 18 may be provided as separate components of the building management system 2. In still other instances, some sensors 18 may be separate components of the building management system 2 while others may be integrated with a discrete air conditioner controller 10. These are just some example configurations. The central coordinator 14 may be configured to use signal(s) received from the one or more sensors 18 to operate or coordinate operation of the one or more discrete air conditioner units 20 and/or the lighting banks 26 located within the building or structure.

The one or more sensors 18 may be any one of a temperature sensor, a humidity sensor, an occupancy sensor, a light sensor, a current sensor, and/or any other suitable sensor. In one example, at least one of the sensors 18 may be an occupancy sensor. The central coordinator 14 and/or discrete air conditioner controller 10 may receive a signal from the occupancy sensor 18 indicative of occupancy within a room or zone of the building or structure 6. In response, the central coordinator 14 and/or discrete air conditioner controller 10 may send a command to one or more discrete air conditioner units 20 and/or lighting controllers 24 located in the room or zone where occupancy is sensed for activating at least one discrete air conditioner unit 20 and/or lighting controller 24.

Likewise, in some cases, at least one of the sensors 18 may be a temperature sensor configured to send a signal indicative of the current temperature in a room or zone of the building or structure 6. The central coordinator 14 and/or discrete air conditioner controller 10 may receive the signal indicative of the current temperature from the temperature sensor 18. In response, the central coordinator 14 and/or discrete air conditioner controller 10 may send a command to one or more discrete air conditioner units 20 to activate and/or deactivate the discrete air conditioner unit(s) 20 in that room or zone to regulate the temperature in accordance with a predetermined temperature set point.

In yet another example, the sensor 18 may be a current sensor 18. The current sensor 18 may be coupled to the discrete air conditioner unit 20 and/or an electrical circuit providing electrical power to the discrete air conditioner unit 20. The current sensor 18 may be configured to send a signal to the central coordinator 14 and/or discrete air conditioner controller 10 that is indicative of an increase or decrease in current associated with the operation of the discrete air conditioner unit 20. This signal may be used to provide confirmation that a command transmitted by the central coordinator 14 and/or discrete air conditioner controller 10 has been successfully received and acted upon by the discrete air conditioner unit 20.

In some cases, the central coordinator 14 and/or discrete air conditioner controller 10 may operate the one or more discrete air conditioner units 20 located throughout the building or structure 6 in accordance with a programmable operating schedule. In some cases, the programmable operating schedule may include two or more time periods for each of two or more days, with each time period having a corresponding temperature set point and/or a corresponding lighting state. These are just some examples.

Figure 2:
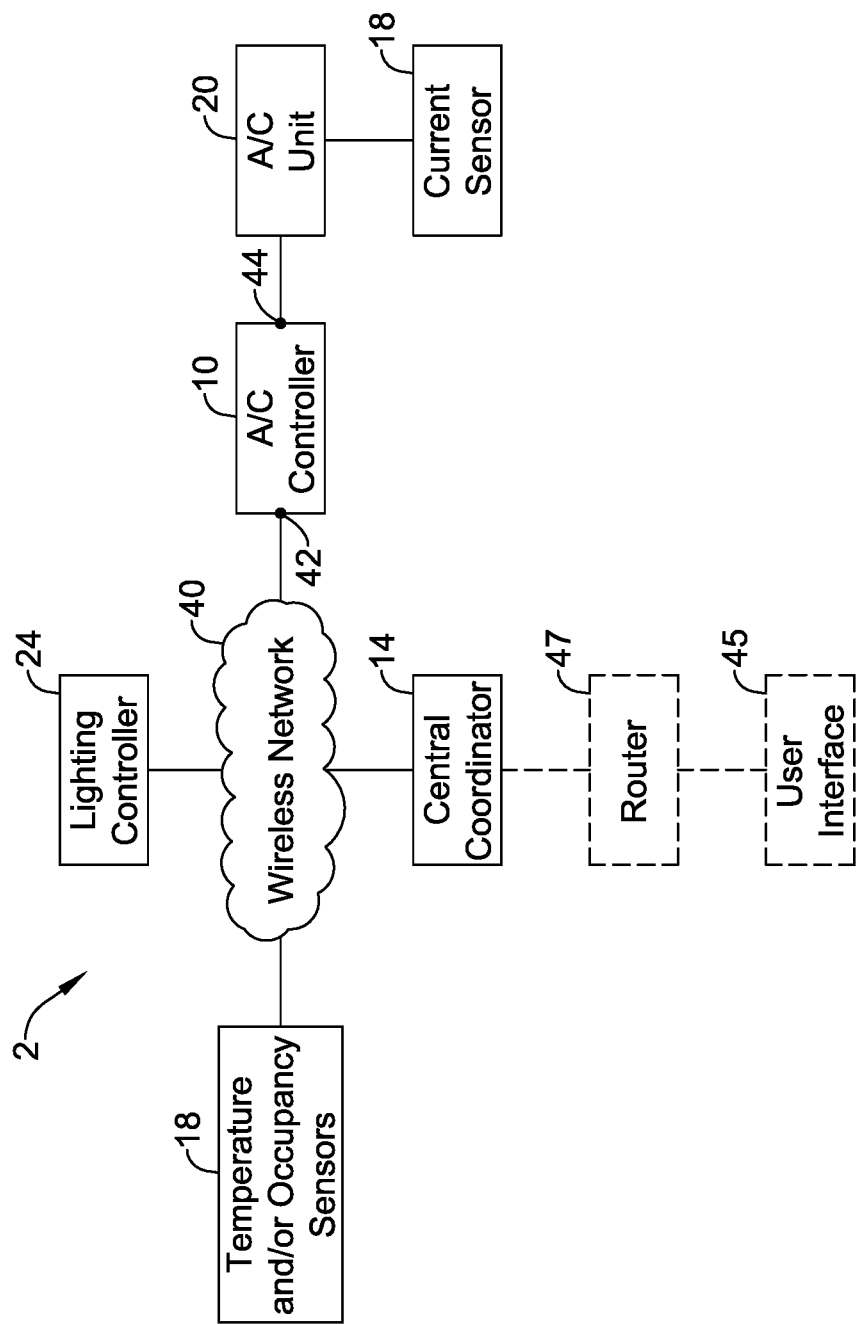
FIG. 2 is a schematic view of an illustrative building management system that may be used to coordinate and control the one or more building components shown in FIG. 1.

FIG. 2 provides a simplified, schematic view of an illustrative building management system 2 that may be used to coordinate and control the discrete air conditioner units 20 and/or lighting banks 26 shown in FIG. 1. In the example shown in FIG. 2, the building management system 2 includes the central coordinator 14, at least one discrete air conditioner controller 10, and, in some cases, at least one lighting controller 24. The central coordinator 14 may be configured to communicate with the at least one discrete air conditioner controller 10 and the at least one lighting controller 24 over a wireless network 40. The central coordinator 14 may be configured to wirelessly communicate over the wireless network 40 using one or more wireless communication protocols such as cellular communication, ZigBee, REDLINK™ Bluetooth, Wi-Fi, IrDA, infra-red, dedicated short range communication (DSRC), EnOcean, and/or any other suitable common or proprietary wireless protocol, as desired. In some cases, the wireless network 40 may be an ad-hoc wireless network. In other cases, the wireless network 40 may be a wireless mesh network and more particularly, a ZigBee wireless mesh network. As shown in FIG. 2, the building management system 2 may include one or more sensors 18 that may be configured to wireless transmit a signal to the central coordinator 14 via the network 40 to facilitate operation and control of the discrete air conditioner units 20 and/or lighting banks 26 servicing the building or structure 6. In addition, the wireless network 40 may include one or more routers (not shown in FIG. 2) to extend and expand communication at the network level.

In some instances, as shown in FIG. 2, a user interface 45 may be provided that is separate from the central coordinator 14 and that facilitates a user's interactions with the central coordinator 14 located within the building or structure. The user interface 45 may be provided by a number of remote devices including a smart phone, a tablet computer, a laptop computer, or a desktop computer. In some cases, the user interface 45 may communicate with the central coordinator 14 via a router 47 such as, for example, a Wi-Fi or Internet router. In other cases, the user interface 45 may be provided at the central coordinator 14 and share a common housing with the central coordinator 14.

In some instances, the discrete air conditioner controller(s) 10 may include a first wireless interface 42 for receiving a first wireless signal from the central coordinator 14 sent via the wireless network 40 in a first wireless signal format. The discrete air conditioner controller(s) 10 may also include a second wireless interface 44 for transmitting a control signal to the discrete air conditioner unit 20. In some cases, the first wireless interface 42 is a radio frequency (RF) wireless interface, and the second wireless interface is an infra-red (IR) wireless interface. If the network 40 is a mesh network, the discrete air conditioner controller(s) 10 may serve as the end node(s).

In some cases, the discrete air conditioner controller(s) 10 may be configured to transition from a sleep or passive mode in which less power is consumed to an active mode in which more power is consumed. The discrete air conditioner controller 10 may be configured to transmit and/or receive signals over the wireless network 40 while in the active mode, and not transmit or receive signals over the wireless network 40 while in the sleep or passive mode. In some cases, the discrete air conditioner controller may be configured to transition between the sleep mode and the active mode in accordance with a schedule. The transition schedule may be transmitted from the central coordinator 14 to the discrete air conditioner controller(s) 10 via the mesh network 40. Alternatively, or in addition, the discrete air conditioner controller(s) 10 may be configured to transition from a sleep or passive mode to the active mode in accordance with a beacon signal received from the central coordinator 14.

Figure 3:
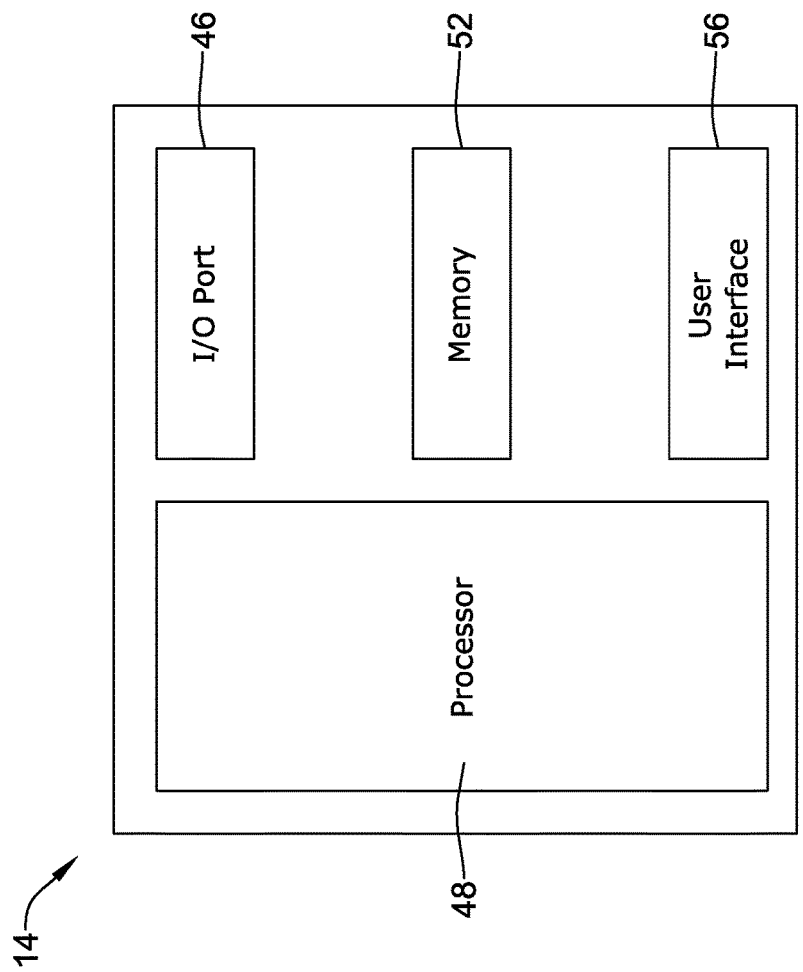
FIG. 3 is a schematic block diagram of an illustrative central coordinator.

FIG. 3 provides a schematic block diagram of an illustrative central coordinator 14 that may be utilized in the building management system 2 of FIG. 2. In some cases, the central coordinator 14 may be a dedicated tablet computer, a laptop computer, a desktop computer, a smart phone, a server, or other remote device used to coordinate and control the various building components servicing the building or structure 6. As shown in FIG. 3, the central coordinator 14 may include an input/output port 46 for transmitting and receiving signals over the wireless network 40. In some instances, the input/output port 46 can be a wireless communications port for wirelessly sending and/or receiving signals over the wireless network 40. In one example, the input/output port 46 may include a low frequency radio frequency (RF) transceiver for transmitting and/or receiving RF signals on a ZigBee wireless mesh network. In other cases, as will be described in greater detail herein, the central coordinator 14 may also include a wired or wireless router or gateway for connecting to a communications network, but this is not required. The router or gateway may be integral to the central coordinator 14 or may be provided as a separate device. Additionally, the central coordinator 14 may include a processor (e.g. microprocessor, microcontroller, etc.) 48 and a memory 52. The central coordinator 14 may also have a user interface 56 including a display (not shown), but this is not required. In some cases, the central coordinator 14 may communicate with one or more remote temperature sensors, humidity sensors, lighting sensors, and/or occupancy sensors, which may be located throughout the building or structure 6, via the I/O port 46. Additionally, the central coordinator 14 may communicate with a temperature sensor and/or humidity sensor located outside of the building or structure for sensing an outdoor temperature and/or humidity, if desired.

The processor 48 may operate in accordance with an algorithm for controlling the one or more discrete air conditioner units 20 and/or lighting banks 26 located within the building or structure 6 as shown in FIG. 1. It will be generally understood by those skilled in the art that the discrete air conditioner units 20 may be controlled independently of the lighting banks 26. The processor 48, for example, may cause the central coordinator 14 to send out command signals to one or more discrete air conditioner units 20 in accordance with a control algorithm that provides temperature set point changes, humidity set point changes, schedule changes, start and end time changes, operating mode changes, and/or the like. Additionally, the processor 48 may cause the central coordinator 14 to send out command signals to one or more lighting banks in accordance with a predetermined occupancy schedule, operating mode changes, and/or in response to an indication of occupancy received from an occupancy sensor located within the building or structure 6. At least a portion of the control algorithm may be stored locally in the memory 52 of the central coordinator 14.

In some cases, the processor 48 may cause the central coordinator 14 to operate according to a first operating mode having a first temperature set point, a second operating mode having a second temperature set point, a third operating mode having a third temperature set point, and/or the like. In some cases, the first operating mode may correspond to a scheduled mode, and the second operating mode may correspond to a comfort mode. The scheduled mode may be modified by a user to suit the user's particular expected scheduling, and in some cases, may allow a user to change one or more temperature set points and/or one or more schedule times to suit the user's needs. A comfort mode, when provided, may allow a user to determine an operating schedule, but may put some restrictions on the temperature setpoints and/or schedule times to help balance a comfortable temperature set point with energy efficiency and cost savings. A third operating mode, when provided, may correspond to an economy mode, where the operating schedule and corresponding temperature set points may be set by the manufacturer and/or building owner, and may provide a higher level of energy efficiency and cost savings. These are just some example operating modes. It will be understood that the processor 48 may be programmed to cause the central coordinator 14 to operate according to additional modes as necessary or desired. The number of operating modes and the operating parameter settings associated with each of the operating modes may be established by the user locally through the user interface 56. In some cases, the processor 48 may be pre-programmed for the user's convenience with one or more default operating modes: scheduled, comfort and economy. In some cases, the user may be able to select the default operating mode through the user interface 56 of the central coordinator 14 for a selected discrete air conditioner unit 20 or group of units and/or lighting bank(s) 26.

In the illustrative embodiment shown in FIG. 3, the user interface 56, when provided, may be any suitable user interface that permits the central coordinator 14 to display and/or solicit information, as well as accept one or more user interactions with the central coordinator 14. Through the user interface 56 of the central coordinator 14, the user may view and manage operation of building components (e.g. discrete air conditioner units 20, lighting banks 26, etc.) that service the building or structure 6. In some cases, the user may be able to group one or more discrete air conditioner units 20 and/or lighting banks 26 to form an operating group and establish operating zones within the building or structure 6. Alternatively, or in addition, the user may be able to set up an operating schedule and select an operating mode for an individual discrete air conditioner unit 20 and/or a group of discrete air conditioner units 20. Different operating schedules and/or operating modes may be selected for different discrete air conditioner units 20 and/or groups of discrete air conditioner units 20. The ability to view and manage multiple building components servicing the building or structure 6, including one or more discrete air conditioner units 20 and/or lighting banks 26, may facilitate improved management of the facility wide energy load which may lead to both energy and cost savings.

In one example, the user interface 56 may be a physical user interface that is accessible at the central coordinator 14 and may include a display and/or a distinct keypad. The display may be any suitable display. In some instances, a display may include or may be a liquid crystal display (LCD), and in some cases a fixed segment display or a dot matrix LCD display. In other cases, the user interface 56 may be a touch screen LCD panel that functions as both display and keypad. The touch screen LCD panel may be adapted to solicit values for a number of operating parameters and/or to receive such values, but this is not required. In still other cases, the user interface 56 may be a dynamic graphical user interface.

The memory 52 of the illustrative central coordinator 14 may be in communication with the processor 48. The memory 52 may be used to store any desired information, such as the aforementioned control algorithm, set points, schedule times, zones and groupings of air conditioner controllers 10 and/or lighting controllers 24, and the like. The memory 52 may be any suitable type of storage device including, but not limited to, RAM, ROM, EPROM, flash memory, a hard drive, and/or the like. In some cases, the processor 48 may store information within the memory 52, and may subsequently retrieve the stored information from the memory 52.

Figure 4:
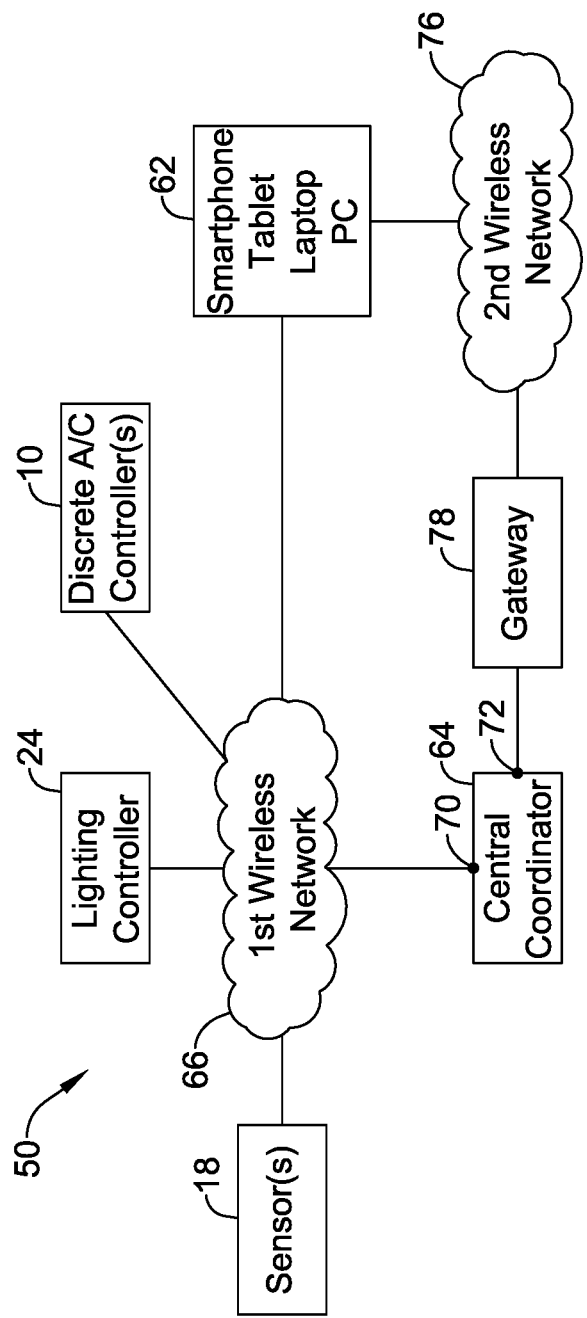
FIG. 4 is a schematic view of an illustrative building management system that may facilitate remote access and/or control.

FIG. 4 is a schematic view of another exemplary building management system 60 that may facilitate remote access and/or control using a remote device 62, and that may be used to coordinate and control the discrete air conditioner units 20 and/or lighting banks 26 shown in FIG. 1. In the illustrative example shown in FIG. 4, the building management system 2 includes a central coordinator 64, at least one discrete air conditioner controller 10, and, in some cases, at least one lighting controller 24. The central coordinator 64 may be configured to communicate with the at least one discrete air conditioner controller 10 and the at least one lighting controller 24 over a first wireless network 66. The first wireless network 66 utilize one or more wireless communication protocols including, but not limited to, cellular communication, ZigBee, REDLINK™, Bluetooth, Wi-Fi, IrDA, infra-red, dedicated short range communication (DSRC), EnOcean, and/or any other suitable common or proprietary wireless protocol, as desired. In some cases, the first wireless network 66 may be an ad-hoc wireless network. In other cases, the first wireless network 66 may be a wireless mesh network and more particularly, a ZigBee wireless mesh network. If the first wireless network 66 is a mesh network, the discrete air conditioner controller(s) 10 may serve as the end node(s).

In some cases, the discrete air conditioner controller(s) 10 may be configured to transition from a sleep or passive mode in which less power is consumed to an active mode in which more power is consumed. The discrete air conditioner controller(s) 10 may be configured to transmit and/or receive signals over the first wireless network 66 while in the active mode, and may not transmit or receive signals over the first wireless network 66 while in the sleep or passive mode. In some cases, the discrete air conditioner controller(s) 10 may be configured to transition between the sleep mode and the active mode according to a schedule. In some cases, the transition schedule may be transmitted from the central coordinator 64 to the discrete air conditioner controller 10 via the first wireless network 66. In other cases, the discrete air conditioner controller 10 may be configured to transition from the sleep or passive mode to the active mode in accordance with a beacon signal received from the central coordinator 64.

In some instances, the central coordinator 64 may be adapted to communicate over one or more additional wired or wireless networks that may accommodate remote access and/or control of the central coordinator 64 via a remote device 62 such as, for example, a smart phone, tablet computer, laptop computer, personal computer, PDA, and/or the like. In some cases, the remote device 62 may provide a primary and/or a secondary user interface for the user to interact with the central coordinator 64. As shown in FIG. 4, the central coordinator 64 may include a first communications port 70 for communicating over the first wireless network 66, and a second communications port 72 for communicating over a second network 76. In some cases, the first wireless network 66 may be a wireless local area network (LAN) such as, for example, a wireless mesh network, as discussed above, and the second network 76 (when provided) may be a Wi-Fi network or a wide area network such as, for example, the Internet. These are just some examples. Other combinations of wired and wireless networks may be utilized. Additionally, in some cases, the building management system 50 may include a wired or wireless router or gateway 78 for connecting to the second network 76. The router or gateway 78 may be integral to the central coordinator 64 or may be provided as a separate device, as shown in FIG. 4. In some cases, the router or gateway 78 is a Wi-Fi or Internet router. Additionally, in some cases, the gateway 78 may include a web server for serving up one or more web pages that may be accessed and viewed over the second network 76 and, in some cases, the first wireless network 66, using the remote device 62.

Depending upon the application and/or where the user is located, remote access and/or control of the central coordinator 64 may be provided over the first wireless network 66 and/or the second network 76. A variety of wireless remote devices 62 may be used to access and/or control the central coordinator 64 from a remote location over the first wireless network 66 and/or second network 76 including, but not limited to, mobile phones including smart phones, PDAs, tablet computers, laptop or personal computers, and/or the like. In some cases, the wireless remote devices 62 may be configured to communicate wirelessly over the first wireless network 66 and/or second network 76 with the central coordinator 64 via one or more wireless communication protocols including, but not limited to, cellular communication, ZigBee, REDLINK™, Bluetooth, Wi-Fi, IrDA, infra-red, dedicated short range communication (DSRC), EnOcean, and/or any other suitable common or proprietary wireless protocol, as desired. Additionally, the wireless remote device 62 may provide a user interface for interacting with the central coordinator 64.

The wireless remote device 62 may be programmed to include an application code that facilitates communication and control with central coordinator 64. The application program may be provided by and downloaded from an external web service (e.g. Apple Inc.'s ITUNES®, Google Inc.'s Google Play, a proprietary server, etc.) for this purpose, but this is not required. In one example, the application code may cause the wireless remote device 62 to receive and store data from the central coordinator 64. The application programming code may translate the data received from the central coordinator 64 and display the data to the user via the user interface of the wireless remote device 62. Additionally, the application code may be capable of accepting an input from a user through the user interface of the wireless remote device 62 and transmitting accepted data associated with the input to the central coordinator 64. For example, if the user inputs include changes to the existing control algorithm including, for example, temperature set point changes, humidity set point changes, schedule changes, start and end time changes, zoning changes or changes to a group of devices, the application program code may cause the wireless remote device 62 to update the control algorithm and/or parameters of the control algorithm, as applicable, and transmit at least a portion of the updated control algorithm and/or parameters of the control algorithm over the first wireless network 66 or second network 76 to the central coordinator 64 where it is received via one or the communications ports 70 or 72 and stored in the memory of the central coordinator 64 for execution by the central coordinator 64.

Figure 5:
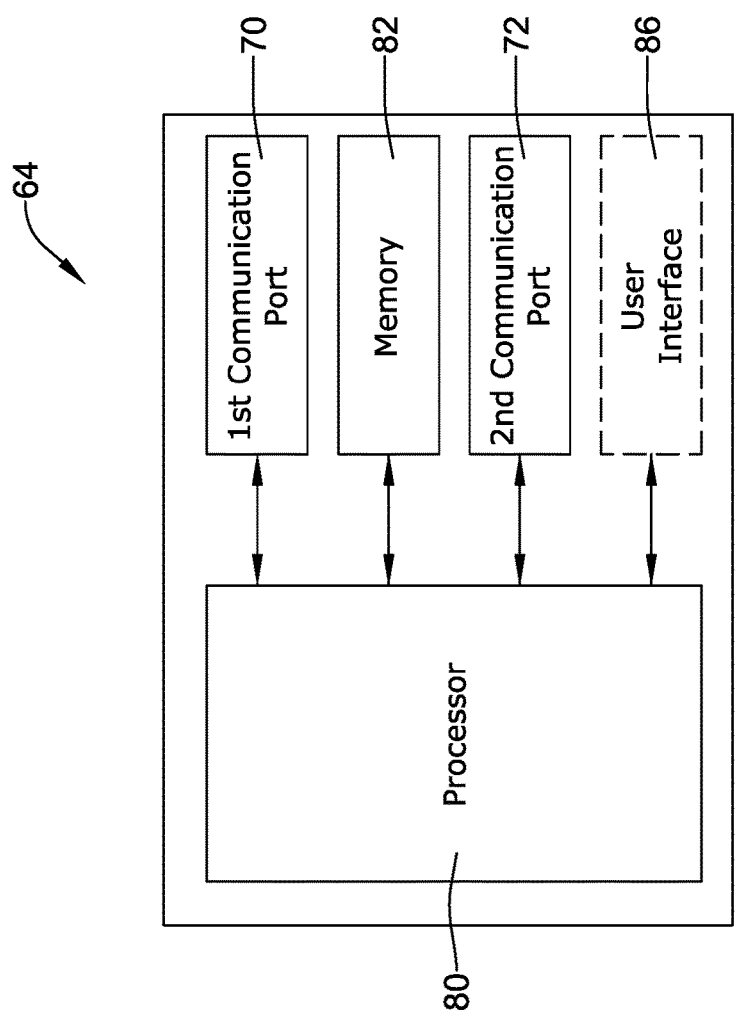
FIG. 5 is a schematic block diagram of another illustrative central coordinator.

FIG. 5 provides a schematic block diagram of an illustrative central coordinator 64 that may be utilized in the building management system 50 of FIG. 4, discussed above, and that may provide remote access and/or control of the building management system 50 from a remote location using a remote device 62. As shown in FIGS. 4 and 5, the central coordinator 64 may include a first communications port 70 for communicating over a first network (e.g. wireless mesh network) and a second communications port 72 for communicating over a second network (e.g. Wi-Fi or Internet). The first communications port 70 can be a wireless communications port including a wireless transceiver for wirelessly sending and/or receiving signals over a first wireless network 66. Similarly, the second communications port 72 may be a wireless communications port including a wireless transceiver for sending and/or receiving signals over a second wireless network 76. In some cases, the second communications port 72 may be in communication with a wired or wireless router or gateway 78 for connecting to the second network, but this is not required. In some cases, the router or gateway 78 may be integral to the central coordinator 64 or may be provided as a separate device, as shown in FIG. 4.

Additionally, the illustrative central coordinator 64 may include a processor (e.g. microprocessor, microcontroller, etc.) 80 and a memory 82. The central coordinator 64 may also include a user interface 86 accessible at the device, but this is not required. For example, as shown in FIGS. 2 and 4, the user interface 86 may be provided by a remote device (e.g. tablet computer or smart phone) that is separate from the central coordinator 64. In some cases, the central coordinator 64 may communicate with one or more remote temperature sensors, humidity sensors, light sensors, current sensors, and/or occupancy sensors located throughout the building or structure 6 via the first wireless network 66. Additionally, in some cases, the central coordinator 64 may communicate with a temperature sensor and/or humidity sensor located outside of the building or structure 6 for sensing an outdoor temperature and/or humidity if desired.

The processor 80 of the central coordinator 64 may operate in accordance with an algorithm for controlling the one or more discrete air conditioner units 20 and/or lighting banks 26 located within the building or structure 6 as shown in FIG. 1. It will be generally understood by those skilled in the art that the discrete air conditioner units 20 may be controlled independently of the lighting banks 26. The processor 80 may, for example, cause the central coordinator 64 to send out command signals to one or more discrete air conditioner units 20 in accordance with a control algorithm that provides temperature set point changes, humidity set point changes, schedule changes, zoning and/or grouping changes, start and end time changes, operating mode changes, and/or the like. Additionally, the processor 80 may cause the central coordinator 64 send out command signals to one or more lighting banks in accordance with a predetermined occupancy schedule, operating mode changes, and/or in response to an indication of occupancy received from an occupancy sensor 18 located within the building or structure 6 (see FIG. 1). At least a portion of the control algorithm may be stored locally in the memory 82 of the central coordinator 64.

In some cases, the processor 80 may cause the central coordinator 64 to operate according to a first operating mode having a first temperature set point, a second operating mode having a second temperature set point, a third operating mode having a third temperature set point, and/or the like. In some cases, the first operating mode may correspond to a scheduled mode, and the second operating mode may correspond to a comfort mode. The scheduled mode may be modified by a user to suit the user's particular expected scheduling, and in some cases, may allow a user to change one or more temperature set points and/or one or more schedule times to suit the user's needs. A comfort mode, when provided, may allow a user to determine an operating schedule, but may put some restrictions on the temperature setpoints and/or schedule times to help balance a comfortable temperature set point with energy efficiency and cost savings. A third operating mode, when provided, may correspond to an economy mode, where the operating schedule and corresponding temperature set points may be set by the manufacturer and/or building owner, and may provide a higher level of energy efficiency and cost savings. These are just some example operating modes. It will be understood that the processor 48 may be programmed to cause the central coordinator 64 to operate according to additional modes as necessary or desired. The number of operating modes and the operating parameter settings associated with each of the operating modes may be established by the user locally through the user interface 86. In some cases, the processor 80 may be pre-programmed for the user's convenience with one or more default operating modes: scheduled, comfort and economy. In some cases, the user may be able to select the default operating mode through the user interface 86 of the central coordinator 64 for a selected discrete air conditioner unit 20 or group of units and/or lighting bank(s) 26.

In the illustrative embodiment of FIG. 5, the user interface 86, when provided, may be any suitable user interface that permits the central coordinator 64 to display and/or solicit information, as well as accept one or more user interactions with the central coordinator 64. For example, the user interface 86 may permit a user to enter data such as temperature set points, humidity set points, starting times, ending times, schedule times, responses to alerts, and the like. Additionally, the user interface 86 may permit a user to establish zones within the building or structure 6 and to group one or more discrete air conditioner controllers and/or one or more lighting controllers together for building management purposes.

In one example, the user interface 86 may be a physical user interface that is accessible at the central coordinator 64, and may include a display and/or a distinct keypad. The display may be any suitable display. In some instances, a display may include or may be a liquid crystal display (LCD), and in some cases a fixed segment display or a dot matrix LCD display. In other cases, the user interface 86 may be a touch screen LCD panel that functions as both display and keypad. The touch screen LCD panel may be adapted to solicit values for a number of operating parameters and/or to receive such values, but this is not required. In still other cases, the user interface 86 may be a dynamic graphical user interface.

In some cases, the user interface 86 need not be physically accessible to a user at the central coordinator 64. Instead, the user interface 86 may be a virtual user interface 86 that is accessible via the first wireless network 66 and/or second network 76 using a wireless remote device 62 such as one of those remote devices 62 previously described herein. In some cases, the virtual user interface 86 may include one or more web pages that are provided over the first wireless network 66 (e.g. LAN) by an internal web server implemented by the processor 80. When so provided, the virtual user interface 86 may be accessed over the first wireless network 66 using a wireless remote device 62 such as any one of those listed above. Through the one or more web pages, the processor 80 may be configured to display information relevant to the current operating status of one or more discrete air conditioner controllers 10 and/or one or more lighting controllers 24 or group of discrete air conditioner controllers 10 and/or one or more lighting controller 24 including the current operating status (e.g. on/off), temperature set point, actual temperature within the building, outside temperature, outside humidity and/or the like. Additionally, the processor 80 may be configured to receive and accept any user inputs entered via the virtual user interface 86 including temperature set points, humidity set points, starting times, ending times, schedule times, zoning and/or grouping changes, responses to alerts, and/or the like.

The memory 82 of the illustrative central coordinator 64 may be in communication with the processor 80. The memory 82 may be used to store any desired information, such as the aforementioned control algorithm, set points, schedule times, building zones, groups of building components, and/or the like. The memory 82 may be any suitable type of storage device including, but not limited to, RAM, ROM, EPROM, flash memory, a hard drive, and/or the like. In some cases, the processor 80 may store information within the memory 82, and may subsequently retrieve the stored information from the memory 82.

Figure 6A:
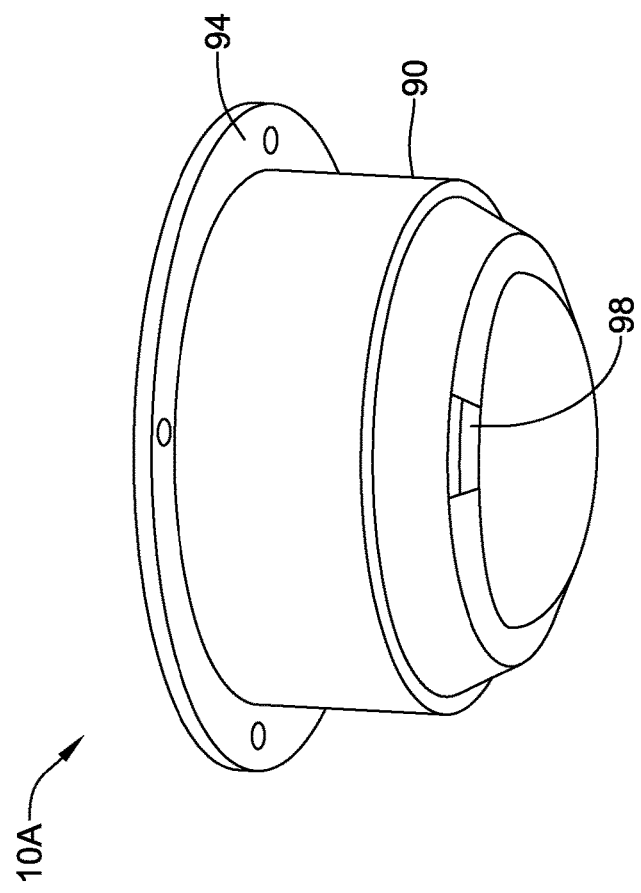
FIGS. 6A and 6B are schematic views of two discrete air conditioner controllers.
Figure 6B:
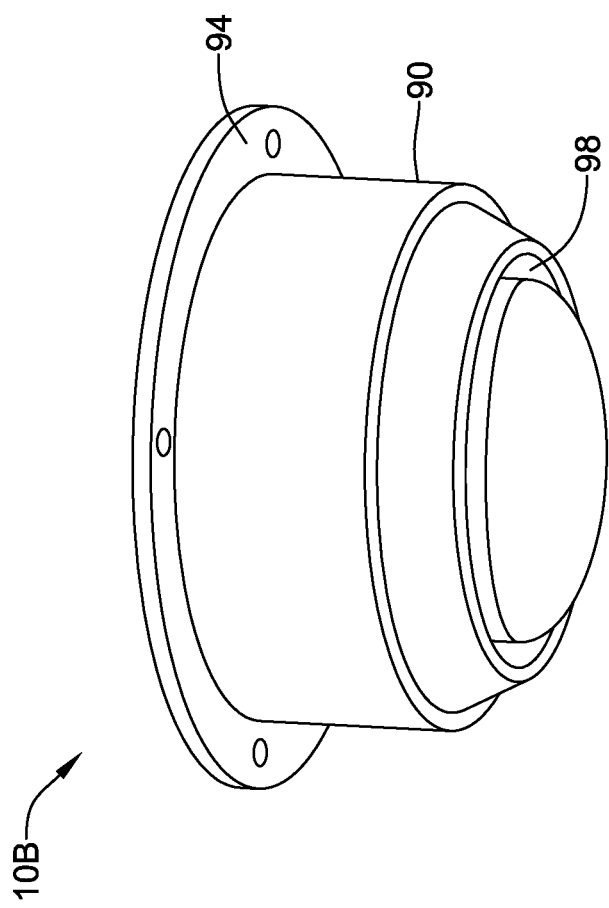

Referring back to FIGS. 2 and 4, the central coordinator 14 and the central coordinator 64 may be both configured to communicate with at least one discrete air conditioner controller 10 for operating one or more discrete air conditioner units 20. FIGS. 6A and 6B are schematic views of two discrete air conditioner controllers 10A and 10B that may be utilized in either of the building management systems 2 and 50, described above. As shown in FIGS. 6A and 6B, the discrete air conditioner controllers 10A and 10B each include a housing 90 and a mounting bracket 94 or other mounting feature to aid in mounting the discrete air conditioner controller 10A, 10B to a wall or ceiling of the building or structure 6. If battery powered, the housing 90 may include a battery holder for holding a battery or batter pack (not explicitly shown). The housing 90 may have any shape or size suitable for housing the internal electronics of the discrete air conditioner controller 10A, 10B. In addition, the housing 90 may include an opening or window 98 to aid in transmitting one or more control signals to one or more discrete air conditioner units 20. The opening or window 98 may extend at least partially around an outer perimeter or circumference of the housing 90. In some cases, the window or opening 98 may extend from about 25 degrees to about 360 degrees and more particularly from about 180 degrees to about 360 degrees about an outer circumference of the housing 90. The housing 90 may include a larger opening or window 98 when the discrete air conditioner controller 10A, 10B is utilized to control multiple discrete air conditioner units 20, but this is not required.

Figure 7:
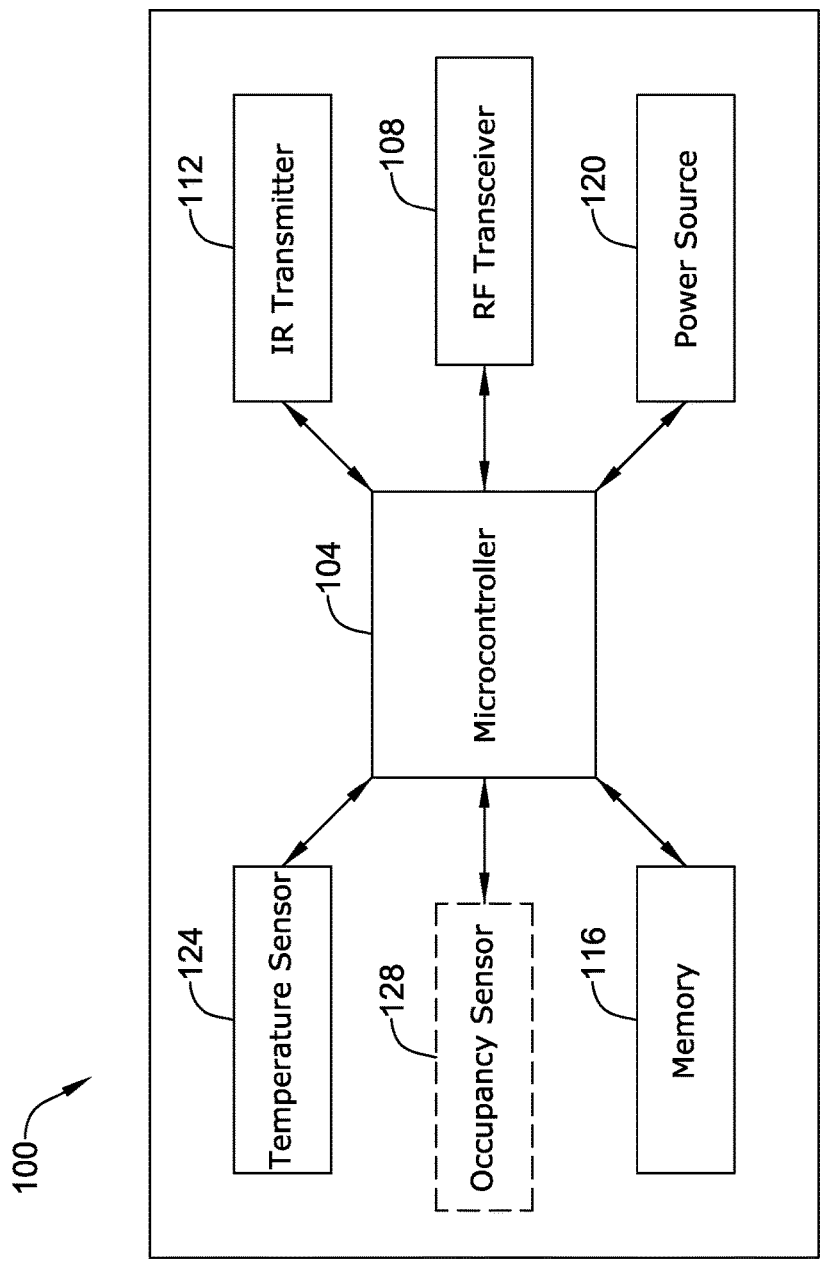
FIG. 7 is a schematic block diagram of an illustrative discrete air conditioner controller.

FIG. 7 is a schematic block diagram of an illustrative discrete air conditioner controller 100 that may be utilized in a building management system such as described in reference to FIGS. 2 and 4, discussed above. The illustrative discrete air conditioner controller 100 may correspond to the discrete air conditioner controller 10A, 10B shown in FIGS. 6A and 6B.

As shown in FIG. 7, the illustrative discrete air conditioner controller 100 includes a microprocessor or microcontroller or 104 coupled to a first wireless interface 108 for remotely sending and receiving signals to and from a central coordinator (e.g. central coordinator 14 or 64, discussed herein), a second wireless interface 112 for sending command signals to one or more discrete air conditioner units 20, a memory 116, and a power source 120. In some embodiments, the first wireless interface 108 may use a different communication protocol than the second wireless interface 112. The first wireless interface 108 may be, for example any one of a mesh network wireless interface, an ad hoc wireless network interface, or a Wi-Fi wireless network interface. Because many of the embodiments described herein provide a retrofit solution for coordinating existing discrete air conditioner units 20 that utilize infra-red technology, the second wireless interface 112 may be an infra-red (IR) wireless interface, but this is not required. As technology improves, other wireless interfaces employing different wireless communication protocols may be utilized.

It is contemplated that other wireless interfaces may be employed for the first wireless interface 108 and/or the second wireless interface 112. In one embodiment, the first wireless interface 108 may be a radiofrequency (RF) wireless interface and the second wireless interface 112 may be an infra-red (IR) wireless interface. The first wireless interface 108 may be capable of communicating with a central coordinator over a first wireless network 40 or 66 as shown in FIGS. 2 and 4. As discussed above, the first wireless network 40 or 66 may be a wireless mesh network and more particularly, a ZigBee wireless mesh network. The air conditioner controller 100 may serve as an end node in a mesh network.

The illustrative discrete air conditioner controller 100 may be battery powered, solar powered, powered by a line voltage, or some combination thereof. For example, in one embodiment, the discrete air conditioner controller 100 may be powered by a line voltage with a battery back-up. In other cases, the discrete air conditioner controller 100 may be battery powered, with no line voltage power source. These are just some examples.

The microcontroller 104 may receive one or more operating parameters for operating one or more discrete air conditioner units 20 (FIG. 1) from the central coordinator 14, 64 via the first wireless interface 108. Additionally, the microcontroller 104 may receive one or more updates and/or changes to the operating parameters from the central coordinator 14 or 64 via the first wireless interface 108. The one or more operating parameters or operating parameter updates may be stored in the memory 116 for retrieval by the microcontroller 104. Exemplary operating parameters may include, for example, temperature set points, humidity set points, start and end time changes, operating mode changes or selections (e.g. scheduled mode, comfort mode, and economy mode), zoning changes, grouping changes, and/or the like.

In some cases, when the discrete air conditioner controller 100 forms a part of a mesh network, the microcontroller 104 may be configured to transition the discrete air conditioner controller 100 between a sleep mode in which less power is consumed and no or minimal (e.g. merely listening for a beacon signal) network communication occurs, and an active mode in which more power is consumed and the discrete air conditioner controller 100 is configured for active network communication. In some cases, the microcontroller 104 may be configured to transition the discrete air conditioner controller 100 between the sleep mode and the active mode according to a predetermined schedule. The predetermined schedule may be communicated from the central coordinator 14, 64 to the discrete air conditioner controller 100 via the first wireless network 40, 66. The discrete air conditioner controller 100 may be configured to transmit data to the central coordinator 14, 64 in the active mode and then return to the sleep mode after the data has been transmitted to the central coordinator 14, 64.

In some cases, the duration of the active mode may be dynamically updated according to one or more density of nodes on the first wireless network 40, 66 and/or the expected traffic on the first wireless network 40, 66. The updated active mode duration may be communicated from the central coordinator 14, 64 to the discrete air conditioner controller 100 as needed. In other cases, the microcontroller 104 may be configured to transition the discrete air conditioner controller 100 from the sleep mode and the active mode in accordance with a beacon signal received from the central coordinator 14, 64. In one instance, the microcontroller 104 may be configured to transition the discrete air conditioner controller 100 from the sleep mode to the active mode in accordance with a predetermined delay after receiving the beacon signal from the central coordinator 14, 64. In some cases, the discrete air conditioner controller 100 may remain in the active mode for a duration that is dynamically set by the beacon signal received from the central coordinator 14, 64.

In some cases, the memory 116 may store at least a portion of a programmable operating schedule for operating one or more discrete air conditioner units 20 and/or one or more lighting controllers 24 located within the building or structure 6. The programmable operating schedule may include one or more time periods per day or group of days, with each time period having a corresponding temperature set point and/or humidity set point. At least a portion of the programmable operating schedule may be delivered from the central coordinator 14, 64 to the discrete air conditioner controller 100 over the first wireless network 40, 66 where it is stored in the memory 116 of the discrete air conditioner controller 100. The programmable operating schedule may be delivered periodically to the discrete air conditioner controller 100 and/or delivered to the discrete air conditioner controller 100 in response to a change initiated by a user. In some cases, the microcontroller 104 may be configured to send out one or more commands to a discrete air conditioner unit 20 via the second wireless interface 112 in accordance with the programmable operating schedule stored in the memory 116. Additionally, the microcontroller 104 may be configured to receive one or more scheduled updates to the programmable operating schedule stored in the memory 116 via the first wireless interface 108 and update the programmable operating schedule accordingly. In some cases, the discrete air conditioner controller 100 may be configured to default to the last operating schedule stored in the memory 116 in the event of a power failure or a lost network connection.

In some embodiments, the discrete air conditioner controller 100 may include a temperature sensor 124 and/or occupancy sensor 128 coupled to the microcontroller 104. The temperature sensor 124 and/or occupancy sensor 128 may be configured to send a signal indicative of the sensed parameter (e.g. temperature or occupancy) to the central coordinator over the first wireless network 40, 66 (FIGS. 2 and 4) via the first wireless interface 108, if desired. In some cases, the microcontroller 104 may be configured to send out one or more commands to a discrete air conditioner unit 20 via the second wireless interface 112 in an attempt to control the temperature in response to the temperature sensed by the temperature sensor 124 in accordance with a temperature set point stored in the memory 116. In addition, the microcontroller 104 may be configured to send out one or more commands to a discrete air conditioner unit 20 via the second wireless interface 112 in an attempt to control the temperature sensed by the temperature sensor 124 after a set point update has been received from the central coordinator 14, 64 via the first wireless interface 108.

When the discrete air conditioner controller 100 includes an occupancy sensor 128 in addition to or in lieu of a temperature sensor 124, the microcontroller 104 may be configured to control the temperature in response to an indication of occupancy sensed by the occupancy sensor. In some cases, the occupancy sensor 128 may detect motion or movement in the room and/or zone of the building or structure 6 in which the discrete air conditioner controller 100 is installed. The microcontroller 104 may be configured to control the temperature in the room and/or zone in accordance with first temperature set point stored in the memory 116 when the occupancy sensor 128 indicates occupancy. The microcontroller may be configured to control the temperature in the room and/or zone in accordance with a second temperature set point when the occupancy sensor 128 does not detect and/or indicate occupancy. In some cases, the indication of occupancy may cause the microcontroller 104 to send out a command to a discrete air conditioner unit 20 in accordance with a first temperature set point stored in the memory 116 regardless of any programmed operating schedule that it may be currently following. The microcontroller 104 may be configured to return to following the programmed operating schedule stored in the memory when the occupancy sensor 128 no longer indicates occupancy. This is just an example.

In some cases, the discrete air conditioner controller 100 may be configured to transition between a sleep mode and an active mode. In some cases, when the discrete air conditioner controller 100 is in the sleep mode, at least one of the temperature sensor 124 and/or occupancy sensor 128 may be inactive. In other cases, when the discrete air conditioner controller 100 is in the sleep mode, at least one of the temperature sensor 124 and/or occupancy sensor 128 may be active. When the discrete air conditioner controller 100 is in the active mode, at least one of the temperature sensor 124 and/or the occupancy sensor 128 may be active and may be configured to communicate a measure related to a parameter (e.g. temperature or occupancy) sensed by the at least one sensor (e.g., the temperature sensor 124 and/or the occupancy sensor 128) to the central coordinator 14, 64 via the first wireless interface 108. In some cases, the sensing of a parameter (temperature, occupancy, lights, etc.) by at least one of the sensors 124 and/or 128 may cause the discrete air conditioner controller 100 to transition from the sleep mode to the active mode. In one example, the discrete air conditioner controller 100 may be configured to switch from the sleep mode to the active mode when a measure related to a parameter sensed by at least one of the temperature sensor 124 and/or the occupancy sensor 128 meets one or more predetermined criteria. These are just some examples. It will be generally recognized by those of skill in the art that the discrete air conditioner controller 100 may also include other types of sensors including, for example, a humidity sensor, a lighting sensor, a noise sensor, and/or any other suitable sensor, as desired.

In some cases, each discrete air conditioner unit 20 in the building or structure 6 may be associated with and capable of receiving command codes from a corresponding handheld remote control unit (not shown) that is often provided by the manufacturer of the discrete air conditioner unit 20. The command codes transmitted by a handheld remote control unit may be unique to the discrete air conditioner unit 20 that the handheld remote control unit is associated. In some cases, the illustrative discrete air conditioner controller 100 may be configured to accept one or more command codes or a set of command codes from a handheld remote control unit associated with an individual discrete air conditioner unit 20 via the second wireless interface 112, and to use at least one command code accepted from the handheld remote control unit when transmitting one or more control commands to the discrete air conditioner unit 20. The discrete air conditioner controller 100 may be further configured to store one or more command codes in the memory 116 where they may be retrieved by the microcontroller 104. In some cases, the discrete air conditioner controller 100 may be configured to accept a command code from a handheld remote control unit associated with a discrete air conditioner unit 20 as a raw waveform. The raw waveform may be an infra-red raw waveform, and the raw waveform may not be decoded before being stored in the memory 116 of the discrete air conditioner controller 100. In some cases, the raw waveform may be a digital raw waveform that has been digitized via an A/D converter or the like.

In some embodiments, the discrete air conditioner controller 100 may be configured to transmit one or more command codes accepted from the handheld remote control unit to the central coordinator 14, 64 via the first wireless interface 108 where they may be stored in the memory 52, 82 of the central coordinator 14, 64. In some cases, the one or more command codes may be transmitted to the central coordinator 14, 64 as one or more raw waveforms. In some cases, the command codes or set of command codes may be stored in the memory 52, 82 for subsequent use by other discrete air conditioner controllers 10. The central coordinator 14, 64 may store the raw waveforms in the memory 52, 82, and may not be decoded first. The central coordinator 14, 64 may be configured to retrieve and reproduce at least one of the command codes stored in the memory 52, 82, and transmit the reproduced command codes to the discrete air conditioner controller 100, which may then use the command codes to effect a desired change in operation of a discrete air conditioner unit 20.

In some cases, the central coordinator 14, 64 may receive multiple command codes for controlling multiple different kinds of discrete air conditioner units 20. The central coordinator 14, 64 may be configured to store the command codes in a command code database stored in the memory 52, 82, which may include a plurality of command codes that correspond to a plurality of different kinds of discrete air conditioner units. In some cases, the database may already include command codes corresponding to the most common commercially available kinds or models of discrete air conditioner units 20. These command codes may be pre-loaded into the memory 52, 82 by the manufacturer, or downloaded from the internet. The central coordinator 14, 64 may be configured to identify and retrieve a set of command codes for an individual discrete air conditioner unit 20 and transmit the correct set of command codes for the particularly type of discrete air conditioner unit 20 to the corresponding discrete air conditioner controller 100 for use by the discrete air conditioner controller 100.

In some cases, the discrete air conditioner controller 100 may receive the one or more commands from the central coordinator 14, 64 for operating one or more discrete air conditioner units 20 via the first wireless interface 108. Based on the received command, the discrete air conditioner controller 100 may select an appropriate command code from the set of command codes stored in the memory 116 and transmit the selected command code to the discrete air conditioner unit 20 via the second wireless interface 112 to control the discrete air conditioner unit 20 in a desired manner.

In some cases, the central coordinator 14, 64 may receive a signal from the discrete air conditioner unit 20 or other device confirming successful receipt of the command code by the discrete air conditioner unit 20. In one instance, the discrete air conditioner unit 20 may be configured to transmit an infra-red or digital signal to the central coordinator 14, 64 confirming successful receipt of the command code. In other instances, the signal may be an auditory or visual signal. For example, in one case, the discrete air conditioner unit 20 may emit an audible tone, beep, or noise that may be capable being received by the central coordinator 14, 64. The visual signal may be a flashing light or series of flashing lights that may be detected at the central coordinator 14, 64. In another instance, either the discrete air conditioner controller 100 or central coordinator 14, 64 may include a camera that is trained on the discrete air conditioner unit 20, and that is configured to recognize a change in any parameter settings (e.g. temperature set point, humidity set point, operating mode, etc.) that is displayed on a display of the discrete air conditioner unit 20. The parameter settings may form part of a two dimensional display of the discrete air conditioner unit 10. These are just some examples.

Figure 8:
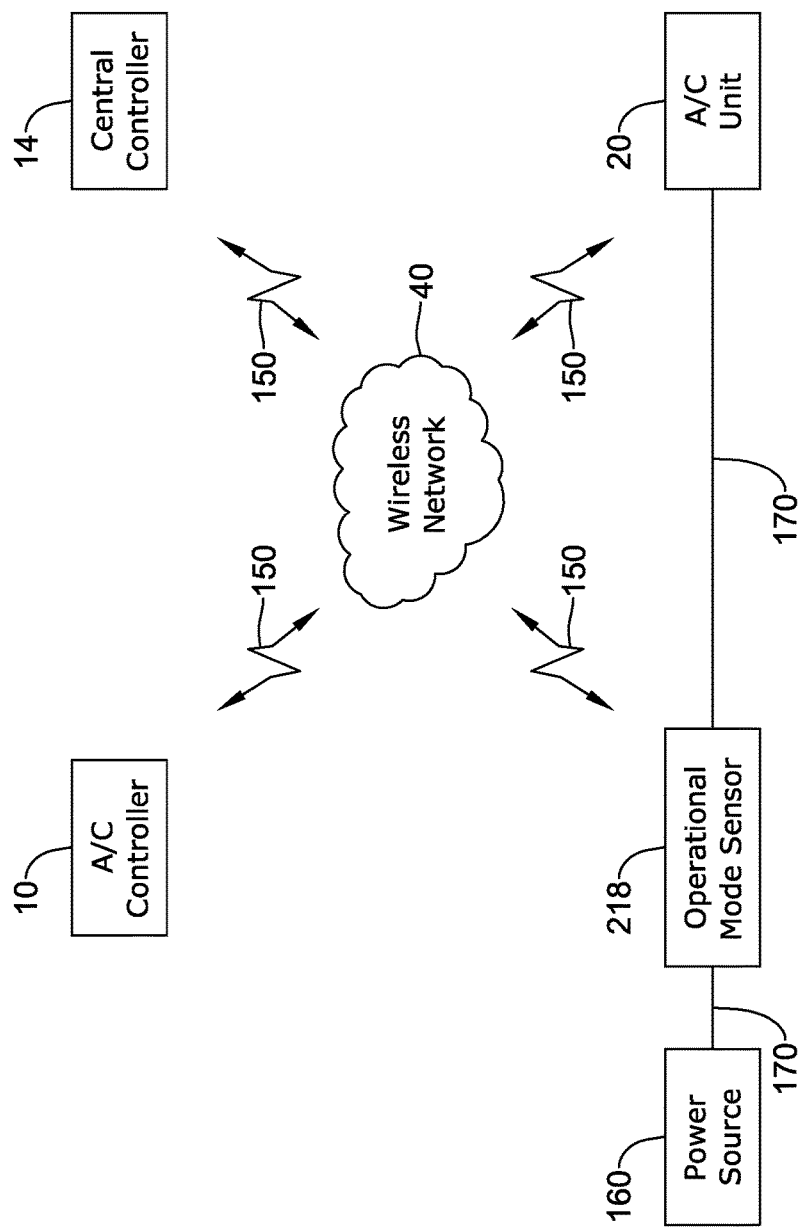
FIG. 8 is a schematic view of an illustrative building management system that may be used to provide operational status information about the one or more building components of FIG. 1.

FIG. 8 is a schematic view of an illustrative building management system 2 that may be used to provide operational status information about the one or more building components of FIGS. 1, 2 and 4. In some cases, the building management system 2 may provide a wireless retrofit solution for obtaining status information from building components that may be installed within a building or structure 6, and that may be incapable of transmitting a message in response to a received wireless or digital command signal. An operational mode sensor 218 may be used to determine the operational mode of one or more building components, and communicate the determined operational mode to a controller, such as the discrete air conditioner controller 10 and/or the central coordinator 14 discussed above.

The building management system 2 may be configured to control one or more building components located within the building or structure 6. The building management system 2 may include one or more discrete air conditioners 20 coupled to a power source 160, a discrete air conditioner controller 10 that may be configured to communicate with and control the one or more discrete air conditioner units 20, a central coordinator 14 that may be configured to accept inputs for the one or more building components from a user via a user interface, and an operational mode sensor 218 associated with one or more discrete air conditioners 20. The operational mode sensor 218 may be capable of determining a present operating mode of the one or more associated discrete air conditioner units 20, and communicating the determined operating mode to central coordinator 14 and/or the discrete air conditioner controller 10. The central coordinator 14, the discrete air conditioner controller 10 and/or the discrete air conditioner unit 20 may be capable of communicating over the wireless network 40 via one or more wireless links 150 using one or more of the wireless communication protocols discussed above (e.g., cellular communication, ZigBee, REDLINK™, Bluetooth, Wi-Fi, IrDA, infra-red, dedicated short range communication (DSRC), EnOcean, and/or any other suitable common or proprietary wireless protocol).

The central coordinator 14 may be configured to control the comfort levels within one or more rooms and/or zones within the building or structure 6. For example, in some cases, the central coordinator 14 may include a user interface 56, a memory 52, and a controller and/or processor 48, wherein the processor 48 may be configured to receive and/or accept an operating schedule from a user via the user interface 56 and store at least a portion of the operating schedule in the memory 52. In some cases, the central coordinator 14 may send at least a portion of the operating schedule to the discrete air conditioner controller 10 via a wireless link 150.

The discrete air conditioner controller 10 may be communicatively coupled to the one or more discrete air conditioner units 20 and the central coordinator 14 via the one or more wireless links 150 via the wireless network 40. In some cases, as discussed above, the discrete air conditioner controller 10 may include the memory 116, a controller (e.g., the microcontroller 104), one or more sensors 124, 128 and a communication circuit (e.g., an RF transceiver of the first wireless interface 108 and an IR transmitter of the second wireless interface 112) located within a housing. In some cases, the memory 116 may be used to store at least a portion of the operating schedule received from the central coordinator 14. The microcontroller 104 may be configured to communicate via the wireless link 150 to send out one or more commands to the one or more discrete air conditioner units 20 in accordance with the operating schedule stored in the memory 116. The discrete air conditioner controller 10 may command the discrete air conditioner unit 20 to enter a specified operational mode, such as a cooling mode, a fan-only mode, or a standby mode, and/or control to a particular temperature.

In some cases, the discrete air conditioner unit 20 may not be capable of communicating its operational status (e.g., an ON condition, an OFF condition, etc.) to the discrete air conditioner controller 10 via the wireless link 150. For example, while the discrete air conditioner unit 20 may be capable of wirelessly receiving an operational command (e.g. via RF command codes) from the discrete air conditioner controller 10, the discrete air conditioner unit 20 may not be capable of wirelessly communicating its current status back to the discrete air conditioner controller 10. In some cases, the discrete air conditioner unit 20 may be configured to provide information about its current operational status on its user interface (e.g., a liquid crystal display, a seven segment display, a graphical user interface, etc.). In such cases, the building management system 2 may include one or more sensors 18, such as the operational mode sensor 218, to provide information about the operational status of the one or more discrete air conditioner units 20 to the discrete air conditioner controller 10 and/or the central coordinator 14. One or more operational mode sensors 218 may also be used to provide information about the operational status of one or more other building components. For example, the operational mode sensor 218 may be capable of sensing the operational status of one or more other building components for lighting, heating, cooling and/or for controlling indoor air quality. These may include the status of a lighting component, a heat pump, a ventilation device (e.g., a fan, a blower, etc.), a pump, a damper controller, a valve controller, an electric heating device, a furnace, a dehumidifier, a humidifier, an air exchange device, a compressor, an air cleaner, and the like.

In some instances, the operational mode sensor 218 may include a camera that is trained on the discrete air conditioner unit 20, and that is configured to recognize a change in any parameter settings (e.g. temperature set point, humidity set point, operating mode, etc.) that is displayed on a display of the discrete air conditioner unit 20. The parameter settings may form part of a two dimensional display of the discrete air conditioner unit 10. In another instance, the operational mode sensor 218 may include a light detector that is trained in on an LED indicator on the discrete air conditioner unit 20. In yet another instance, the operational mode sensor 218 may include a temperature sensor, a flow sensor and/or another suitable sensor that can be used to detect or surmise the current operating state of the discrete air conditioner unit 20.

In some cases, the operational mode sensor 218 may be configured to sense a measure of power (e.g., a current) consumed by the corresponding building component. Typically, alternating current (AC) electrical power may be provided to the building and/or structure 6 via a single phase electrical distribution network, a three-phase electrical distribution network and/or locally via an electrical generator. The electrical power may be distributed throughout the building or structure 6 and may be made accessible to a user via one or more power sources 160 (e.g., a distribution panel, a power outlet, a junction box, etc.). AC power may be provided at a voltage within a range from about 10V to about 480V, at either 50 Hertz or 60 Hertz. In some cases, the electrical power source may be associated with an electrical device (e.g., a transformer, voltage converter, etc.) for converting the electrical line voltage to another voltage level and/or frequency to provide electrical power to one or more building components. For example, energy provided at the power source may be converted to provide direct current (DC) power at a particular voltage. The power source 160 may receive electrical power from the external electrical distribution network and may be used to provide power to one or more components of the building management system 2.

In one example, the discrete air conditioner unit 20 may be connected to a power source 160 (e.g., an electrical distribution panel, an electrical outlet, etc.) via a power connection 170 (e.g., a power cord and/or a multi-conductor cable). The power connection 170 may include one or more individual conductors and/or a cable having two or more individual conductors within a common package. In some cases, a device (e.g., the operational mode sensor 218) may be placed used to sense one or more one or one or more parameters (e.g., a current, a power usage, etc.) that is associated with the current operational state of the discrete air conditioner unit 20. The operational mode sensor 218 may then provide the current operational status of the discrete air conditioner unit 20 to the discrete air conditioner controller 10.

Figure 9:
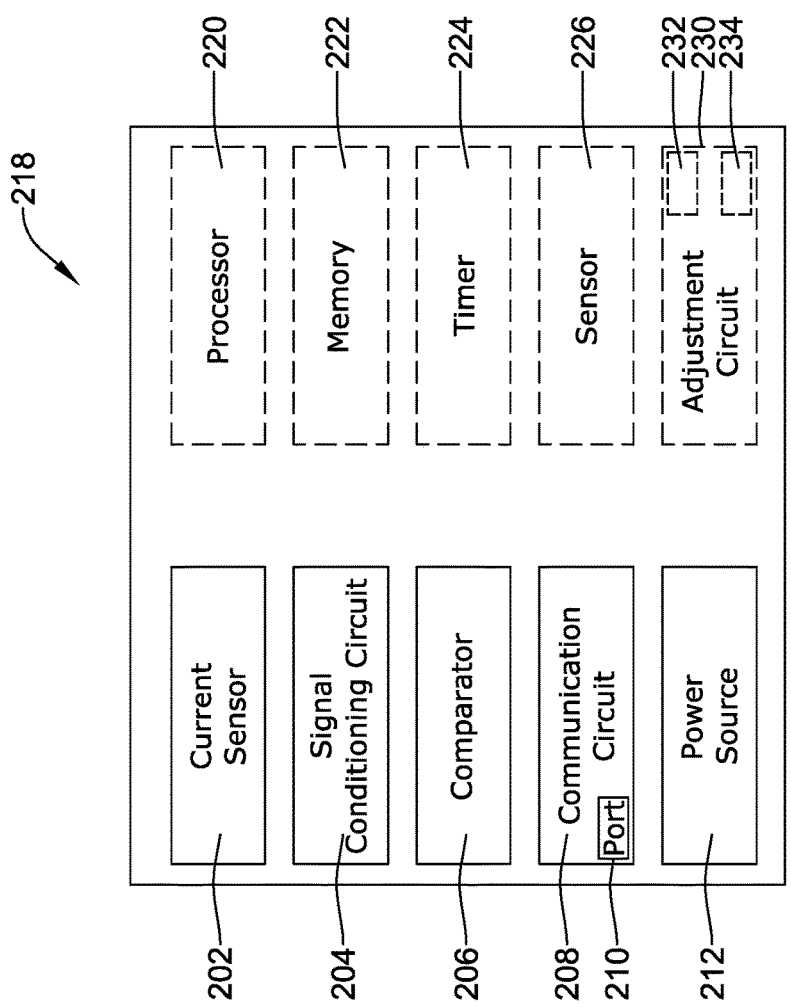
FIG. 9 is a schematic block diagram of an illustrative operational mode sensor.

FIG. 9 is a schematic block diagram of an illustrative operational mode sensor 218 of FIG. 8. In some cases, the operational mode sensor 218 may include one or more current sensors 202, a signal conditioning circuit 204, a comparator 206, a communication circuit 208 and a power source 212. In some cases, the operational mode sensor 218 may include one or more of a processor 220, a memory 222, a timer 224, a sensor 226 other than a current sensor, and an adjustment circuit 230. The operational mode sensor 218 may be configured to determine a current operational mode of an associated building component (e.g., discrete air conditioner unit 20) using a sensed measure of power drawn by the building component. For example, the current sensor 202 may output a signal related to a measure of power drawn by discrete air conditioner unit 20. The signal conditioning circuit 204 may condition the signal received from the current sensor 202 and provide a conditioned (e.g., scaled, filtered, etc.) signal to the comparator 206 for analysis. The comparator 206 may compare the conditioned signal to a specified threshold associated with an operational mode (e.g., an ON condition, an OFF condition, LOW, Medium, High, etc.) of discrete air conditioner unit 20. Based on the result determined by the comparator 206, the operational mode sensor 218 may communicate a determination of the current operational mode of the building component to the air conditioner controller 10 and/or the central coordinator 14.

The operational mode sensor 218 may include one or more current sensors 202 configured to output a signal related to a measure of power (e.g., a current flowing through a conductor) drawn by the building component (e.g., the discrete air conditioner unit 20). The current sensor 202 may be capable of directly and/or indirectly sensing a current in a conductor. For example, the current sensor 202 may include a resistive shunt that can directly measure current flowing through a conductor. In such cases, a voltage drop across the resistive shunt may be proportional to the current flowing through the conductor. Alternatively, currents may be measured indirectly, providing electrical isolation between the conductor and the sensing circuit. For example, the current sensor 202 may include a Hall Effect sensor and/or a current transformer. In such cases, a current carrying conductor, such as a conductor of the power connection 170, may pass through an opening of a magnetically permeable core, such as a center opening of a toroidal core. The core of the current sensor may be a solid core, or may be split to facilitate installation around the conductor. For example, a split core may be coupled around at least one conductor of a power cord of the building component. In some cases, multiple current sensors and/or multiple cores may be used for sensing current in each of two or more current carrying conductors of a multi-phase power connection 170 to the power source 160. The one or more current sensors 202 may produce an output signal corresponding to the current flowing through a conductor of the multi-phase power connection 170. In some cases, the output signal may be a current having a specified range (e.g., between about 4 milliamps to about 20 milliamps), or a voltage waveform centered on a specified offset voltage. In some cases, the output signal may have a waveform that tracks the waveform of the current through the conductors of the power connection 170. For example, when the current sensor 202 senses a generally sinusoidal current waveform in the conductor of the power connection 170, the current sensor may output an output signal having a generally sinusoidal waveform.

The signal conditioning circuit 204 may be configured to condition (e.g. amplify and/or filter) the output signal received from the current sensor 202. For example, the signal conditioning circuit 204 may include one or more one or more electrical components for signal conditioning and/or processing of the output signal received from the current sensor 202. For example, the signal conditioning circuit 204 may include one or more discrete electrical components (e.g., resistors, capacitors, inductors, diodes, transistors, etc.) and/or one or more integrated circuits, such as operational amplifiers, comparators, a rectifier (e.g., a full wave rectifier, a half wave rectifier), a microprocessor, a microcontroller, an application specific integrated circuit ("ASIC"), and/or an application specific standard product ("ASSP"). In some cases, the signal conditioning circuit may include a regulated voltage input for receiving a scaled voltage that may be used with one or more of the electrical components for biasing other electrical components and/or scaling an output signal. The signal conditioning circuit 204 may condition the output signal of the current sensor 202 to correct for offset, sensitivity, non-linearity, temperature effects, and/or other variations. In some cases, the current sensor 202 may provide an AC output signal corresponding to the AC current drawn by discrete air conditioner unit 20. In such cases, the signal conditioning circuit 204 may include a rectifier (e.g., a full-wave rectifier) for producing a value (e.g., a DC value) corresponding to a magnitude of the current drawn by discrete air conditioner unit 20.

The signal conditioning circuit 204 may include one or more filters configured to filter electrical noise and/or other extraneous signals that may be coupled into the output signal provided by the current sensor 202. For example, the signal conditioning circuit 204 may include a low-pass filter implemented as a combination of integrated or discrete elements, such as a resistor and a capacitor configured as a series RC network. Although a first order low-pass filter may be used, it is contemplated that any combination of analog or digital filters can be used, including one or more high pass filters, low pass filters, band pass filters, notch filters, passive filters (e.g., having "T" sections, "π" sections, etc.), active filters (e.g., Chebyshev filter, Butterworth filter, etc.), IIR filters, FIR filters, and/or any other suitable filter or filter combination.

The comparator 206 may be communicatively coupled to the current sensor 202, the signal conditioning circuit 204 and/or the communication circuit 208. The comparator may include one or more discrete electrical components (e.g., a resistor, a capacitor, an inductor, a diode, a transistor, etc.) and/or one or more integrated circuits (e.g., an operation amplifier, a comparator, an ASIC, a microprocessor, a microcontroller, an ASSP, etc.). In some cases, the comparator 206 may receive the conditioned signal from the signal conditioning circuit 204 and compare at least a portion of the conditioned signal to one or more specified thresholds or threshold levels. For example, the comparator may compare the conditioned signal to a specified threshold associated with an ON condition of the building component (e.g., discrete air conditioner unit 20). That is, when the conditioned signal is greater than the threshold, an ON condition of discrete air conditioner unit 20 may be indicated. Conversely, when the conditioned signal is less than the threshold, an OFF condition of discrete air conditioner unit 20 may be indicated.

In some cases, the comparator 206 may compare the conditioned signal to two or more specified thresholds. For example, a first threshold may correspond to a first operational mode of discrete air conditioner unit 20, and a second threshold may correspond to a second operational mode of discrete air conditioner unit 20. In some cases, the first operational mode and the second operational mode may correspond to operational modes when discrete air conditioner unit 20 is ON. For example, the first threshold may correspond to an operational mode indicating that a fan is ON, and the second threshold may correspond to an operational mode indicating that both a compressor and the fan are ON. A third threshold may be used to determine when discrete air conditioner unit 20 is in a standby mode, such as when the air conditioner is ON and neither the fan nor the compressor is ON. For example, the comparator may determine that the air conditioner has been powered OFF, or is otherwise not receiving power when the conditioned signal is less than the third threshold. In some cases, the one or more thresholds may be configurable In some cases, the operational mode sensor 218 may include an adjustment circuit 230 that may include one or more electrical components 232 and a user interface 234.

The adjustment circuit 230 may be coupled to the comparator 206 to allow a user to adjust one or more of the thresholds used by the comparator 206. For example, each of the thresholds may be a specified voltage level associated with a particular current drawn by discrete air conditioner unit 20. The adjustment circuit 230 may allow a user to configure the operational mode sensor 218 to a particular current sensor and/or a particular model of discrete air conditioner unit 20. In some cases, the arrangement of the one or more electrical components (e.g., one or more voltage dividers) may allow a user to select between predetermined voltage levels for each of the thresholds. In some cases, the one or more electrical components may include one or more variable resistors (e.g., potentiometers, rheostats, etc.) that may allow a user to continuously adjust a voltage level until a desired threshold value is reached.

The user interface 234 may include one or more switches and/or transducers. For example, the user interface 234 may include one or more switches, such as dual inline package (DIP) switches, capable of allowing a user to switch between particular discrete voltage levels to select one or more desired thresholds. In some cases, the user interface 234 may include access to one or more transducers associated with one or more variable resistors to allow the user to adjust one or more thresholds. In some cases, the adjustment circuit 230 may allow for remote configuration. For example, the adjustment circuit may include an integrated circuit (e.g., an ASIC, a field programmable gate array (FPGA), a microcontroller, etc.) that may be capable of receiving a configuration command from a remote device (e.g., the air conditioner controller 10, the central coordinator 14, a personal computer, etc.). For example, the remote device may communicate the configuration command to the operational mode sensor 218 via the wireless network 40. The command may be received via the communication circuit 208 and interpreted by the electrical components 232 of the adjustment circuit 230, wherein the adjustment circuit adjusts the one or more thresholds used by the comparator 206 in response to the received command.

The communication circuit 208 may include one or more communication ports 210 to facilitate communication over one or more wireless networks 40 via the wireless link 150. The communication port 210 may include an antenna to allow the operational mode sensor 218 to communicate wirelessly over a wireless LAN, a wireless mesh network and/or another wireless network discussed above. In some cases, the communication port may support one or more wired connections for facilitating communication over one or more wired communication networks. Such networks may operate using one or more communication protocols, such as cellular communication, ZigBee, REDLINK™, Bluetooth, Wi-Fi, IrDA, infra-red, dedicated short range communication (DSRC), EnOcean, and/or any other suitable common or proprietary wireless and/or wired protocol, as desired. The communication circuit 208 may be used by the operational status sensor to transmit a determination of whether the building component is ON or OFF based on the result determined by the comparator, via the wireless network 40 and/or a wired network.

In some cases, the communication circuit 208 may be configured to receive one or more messages from another device, such as the discrete air conditioner controller 10 and/or the central coordinator 14. For example, the discrete air conditioner controller 10 may transmit a command to the operational mode sensor 218 requesting the operational mode of the monitored discrete air conditioner unit 20. In response, the operational mode sensor 218 may determine the operational mode of discrete air conditioner unit 20, such as by using the comparator 206. The determined operational mode of the discrete air conditioner unit 20 may then be communicated to the discrete air conditioner controller 10 and/or the central coordinator 14. The communication circuit 208 may include one or more transceivers for wirelessly sending and/or receiving signals over a first wireless network 40. The communication circuit 208 may comprise a custom integrated circuit and/or chipset configured to communicate using a particular protocol, such as a Zigbee transceiver, a Bluetooth transceiver, a WiFi transceiver, and the like. In some cases, the communication circuit may be configured to minimize power consumption of the operational mode sensor 218. For example, the Zigbee transceiver chip may sleep when not transmitting, which may allow the operational mode sensor 218 to maximize the available energy of the power source 212.

In some cases, the operational mode sensor 218 may be configured to operate on a mesh network. In some cases, the operational mode sensor 218 may be configured to transition from a sleep or passive mode in which less power is consumed to an active mode in which more power is consumed. Additionally, the operational mode sensor 218 may be configured to transmit and/or receive signals over the wireless network 40 in the active mode. The operational mode sensor 218 may not transmit or receive signals over the wireless network 40 in the sleep or passive mode. In some cases, the operational mode sensor 218 may be configured to transition between a sleep mode and an active mode in response to a request for an operational mode of the associated discrete air conditioner unit 20. The transition schedule may be dictated by the central coordinator 14 and/or the discrete air conditioner controller 10 via the network 40. In some cases, the operational mode sensor 218 may be configured to transition from a sleep or passive mode in accordance with a beacon signal received from the central coordinator 14. In some cases, the operational mode sensor 218 may be configured to transition between a sleep mode and an active mode according to a schedule. For example, the operational mode sensor may include a timer 224. The timer 224 may include one or more discrete electrical components and/or integrated circuits and may be configured to time a specified duration. In some cases, the operational mode sensor 218 may transmit the determined operational mode of the building component (e.g., discrete air conditioner unit 20) via the communication circuit 208 after a specified duration that is timed by the timer 224. In some cases, the duration timed by the timer 224 is configurable by a user.

In some cases, the operational mode sensor 218 may include a power source 212 that may include one or more charge storage devices and/or components capable of storing energy, such as a capacitor, a battery, or another electrical and/or mechanical component capable of storing a voltage. For example, the operational mode sensor 218 may include a port capable of receiving a battery. In some cases, the battery may be rechargeable from an external power source and/or by using internal circuitry within the operational mode sensor 218. For example, the operational mode sensor may be configured to steal power from one or more conductors supplying power to the monitored discrete air conditioner unit 20. The stolen power may be used to power the operational mode sensor 218 and/or recharge the charge storage device.

In some cases, the operational mode sensor 218 may include logic to communicate an indication of the remaining energy in the power storage device to a user. For example, the operational mode sensor 218 may include a visual indicator (e.g., an LED), where a status of the visual indicator (e.g., a color, an illumination level, etc.) may be associated with an acceptable power level. The visual indicator may change color (e.g., from green to red) and/or change states (e.g., turn on, turn off, etc.) to indicate that the power level has dropped below a threshold associated with an acceptable power level.

In some cases, the operational mode sensor 218 may include a controller and/or processor 220 and a memory 222, but this is not required. The processor 220 may be configured to access instruction stored in the memory 222 to perform one or more functions of the signal conditioning circuit 204, the comparator 206, the communication circuit 208, the timer 224, and/or the adjustment circuit 230. For example, the processor 220 may include an analog-to-digital converter and may convert an analog output signal received from the current sensor 202 to a digital circuit for signal conditioning and/or other processing. As such, the processor may perform one or more functions of the signal conditioning circuit 204 by processing instructions to provide a value corresponding to a magnitude of the current signal and/or to filter or otherwise condition the output signal received from the current sensor 202.

The memory 222 may be used to store any desired information, such as the aforementioned instructions, set points, schedule times, diagnostic limits such as, for example, differential pressure limits, delta T limits, and the like. The memory 222 may be any suitable type of storage device including, but not limited to, RAM, ROM, EPROM, flash memory, a hard drive, and/or the like. In some cases, the processor 220 may store information within the memory 222, and may subsequently retrieve the stored information from the memory 222.

In some cases, the processor may be configured to process instructions for comparing the conditioned signal to one or more thresholds. In some cases, the thresholds may be pre-selected and stored in the memory 222. In other cases, the thresholds may be entered and/or modified by a user, either locally through a user interface at the operational mode sensor 218 and/or via the wireless network 40. The memory 222 may be capable of storing information about one or more air conditioner models, thresholds corresponding to current levels associated with one or more operational modes of the one or more air conditioner models, and the like. The controller and/or processor 220 may be configured to determine the specified threshold using the information about the one or more different air conditioner models. In some cases, the processor 220 and the memory 222 may be used to monitor and/or store information about the current drawn by and/or the operational modes of discrete air conditioner unit 20 for a specified duration. For example, the processor 220 may perform instructions to determine a duty cycle of the air conditioner unit by monitoring the conditioned current signal over a specified duration. For example, the processor 220 may use one or more thresholds associated with an ON condition, wherein the duty cycle may be calculated by comparing a duration spent ON to a duration spent OFF. In some cases, the controller and/or processor 220 may determine an operational mode of discrete air conditioner unit 20 using the duty cycle.

In some cases, the operational mode sensor 218 may include one or more other sensors 226, such as a humidity sensor, the temperature sensor 124 and/or the occupancy sensor 128 discussed above. The sensors 226 may be configured to provide a temperature and/or occupancy signal to the processor 220 for use in determining an operational mode. In some cases, the one or more sensors 226 may be communicatively coupled to the communication circuit to provide a sensed signal (e.g., a temperature, an occupancy state, a humidity, etc.) to a controller, such as the air conditioner controller 10 and/or the central coordinator 14.

Figure 10A:
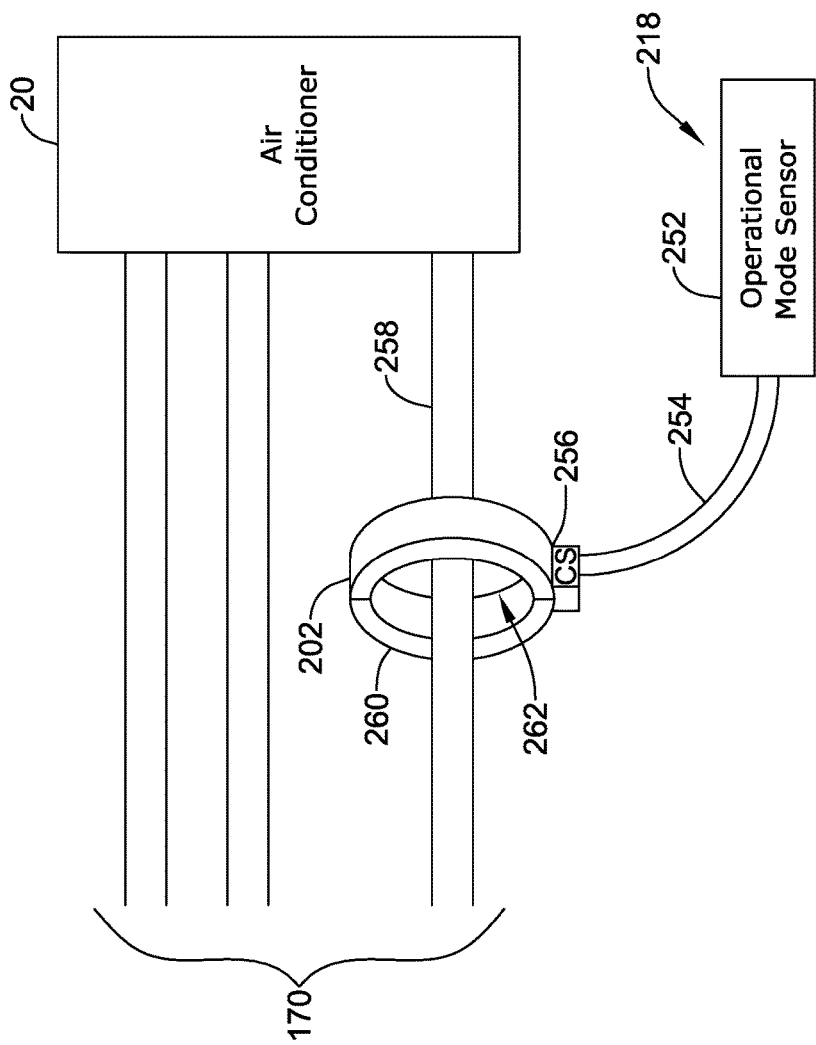
FIGS. 10A and 10B show block diagram representations of different embodiments of the illustrative operational mode sensor of FIGS. 8 and 9.
Figure 10B:
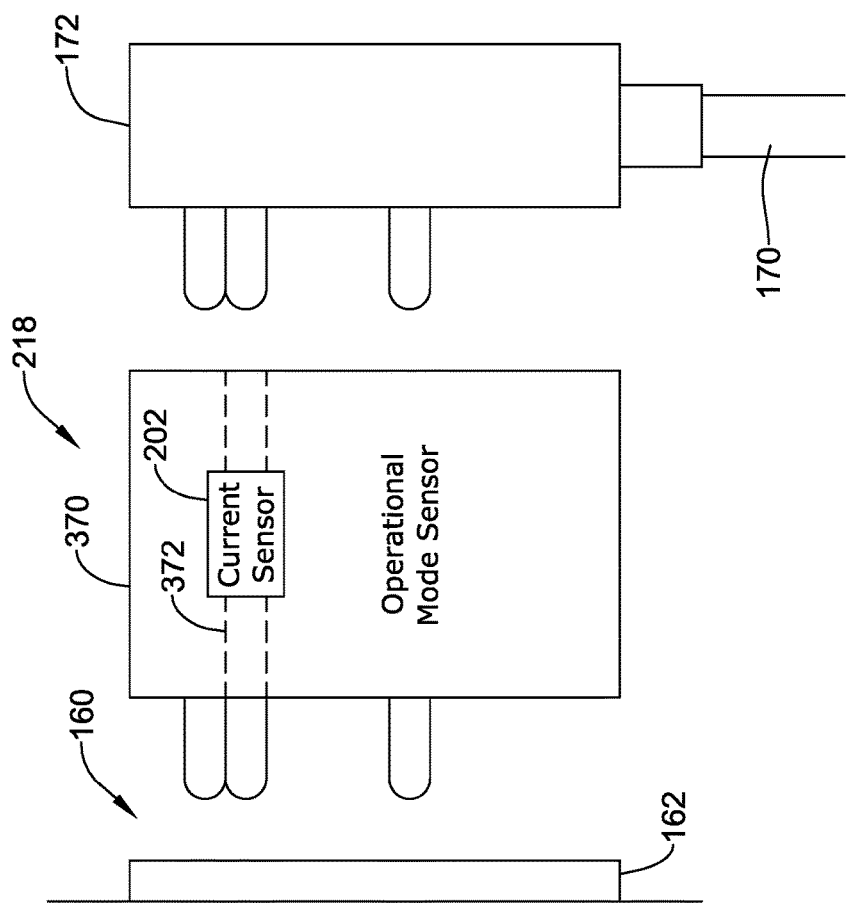

FIGS. 10A and 10B are block diagrams of different examples operational mode sensor configurations. FIG. 10A shows an operational mode sensor 218 having a clamp style and/or split ring current sensor 202 external to a housing 252. In some cases, the current sensor 202 may be coupled to the housing 252 of the operational mode sensor via a cable 254. In other cases, the housing 2506 of the current sensor 202 may be integrated with the housing 252 forming a continuous housing. In some cases, the current sensor may include a mechanism allowing the current sensor 202 to be clamped around a conductor 258 of the power connection 170 (e.g., a power cable) to discrete air conditioner unit 20. In other cases, the current sensor 202 may include one or more removable sections 260, wherein a user may remove one or more of the removable sections 260 to allow the conductor 258 to pass through the opening 262 through the current sensor 202.

FIG. 10B shows a block diagram representation of an operational mode sensor 218 having one or more current sensors 202 integrated within a common housing 370. In some cases, the operational mode sensor 218 may be configured to be electrically coupled between the power source 160 (e.g., a power outlet 162) and a plug 172 of the power cord 170 of discrete air conditioner unit 20. For example, the operational mode sensor 218 may be plugged into the power outlet 162 and the power cord 170 of discrete air conditioner unit 20 may be plugged into the operational mode sensor 218. In some cases, one or more conductors 372 may be configured to pass electrical power from the power outlet 162 to the plug 172. The current sensor 202 may be positioned around and/or adjacent to the conductors 372 to sense the current drawn by the air conditioner. In this case, the operational mode sensor 218 may draw power from the power source 160.

Figure 11:
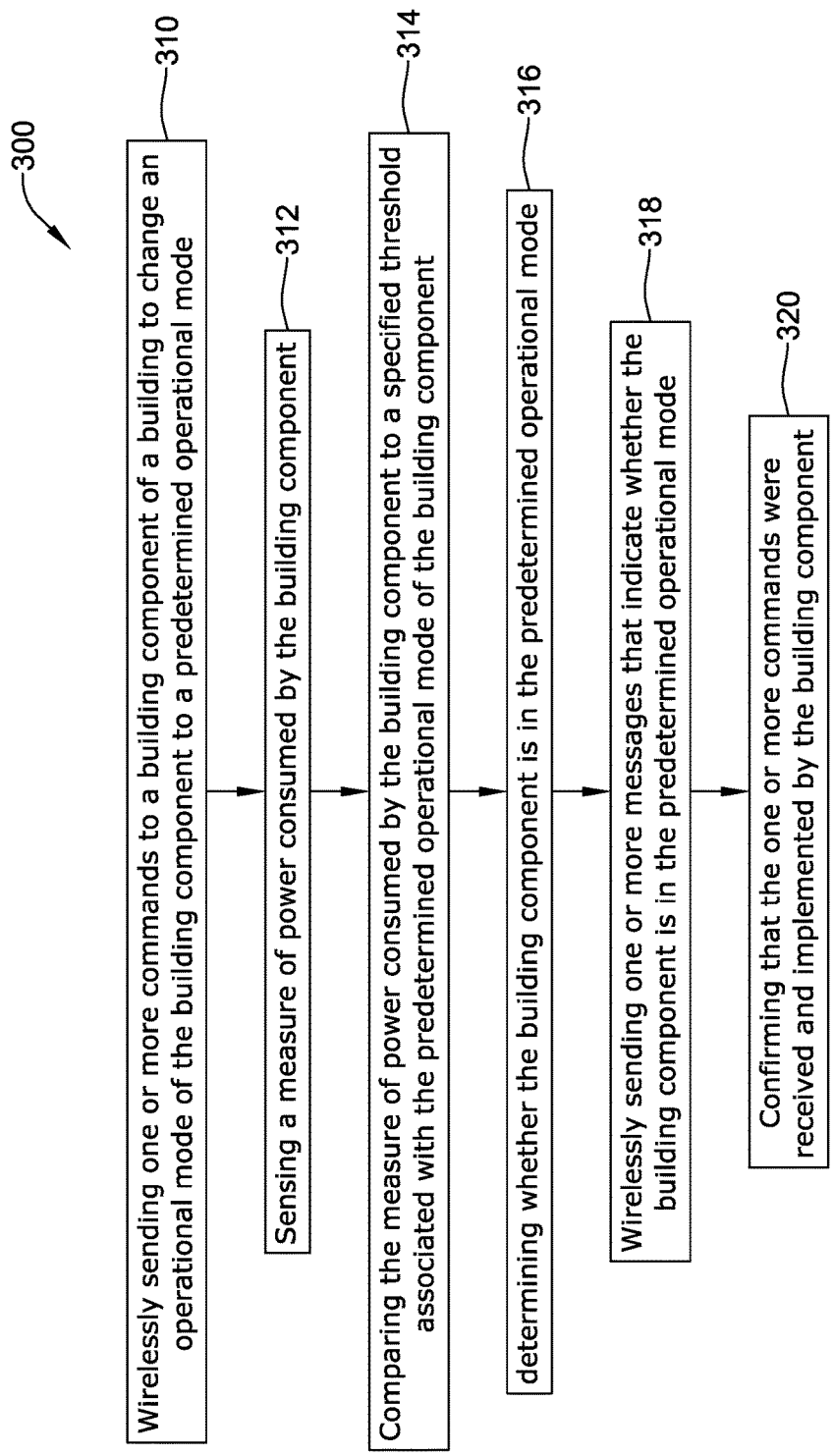
FIG. 11 shows an illustrative method for confirming that one or more commands that sent to a building component of a building were received and implemented.

FIG. 11 shows an illustrative method 300 for confirming that one or more commands sent to a building component of a building or structure 6 were received and implemented. At 310, a controller, such as the discrete air conditioner controller 10 and/or the central coordinator 14, may wirelessly send one or more commands to a building component (e.g., discrete air conditioner unit 20) of a building or structure 6. In some cases, the one or more commands may be configured to change an operational mode of the air conditioner to a predetermined operational mode. At 312, a sensor associated with the operational mode sensor 218 may be configured to sense a measure of power consumed by the building component. For example, the current sensor 202 may sense a current in a conductor of a power connection 170 supplying power to discrete air conditioner unit 20. At 314, the operational mode sensor 218 may compare the measure of power consumed by the building component to a specified threshold associated with the predetermined operational mode of the building component. In some cases, the specified threshold may be based on a type and/or model of the building component. At 316, based on the comparison, the operational mode sensor 218 may determine the current operating mode of the building component. At 318, the operational mode sensor 218 may wirelessly send one or more messages that indicate the current operating mode of the building component. For example, the operational mode sensor 218 may send a message indicating that the operational mode of discrete air conditioner unit 20 is an ON mode or an OFF mode. In some cases, the ON mode may correspond to a fan ON mode and/or a compressor ON mode, and the OFF mode may correspond to a power OFF mode and/or a standby mode. At 320, the controller (e.g., the air conditioner controller and/or the central coordinator 14) may confirm that the one or more commands were received and implemented by the building component, if the building component is in the predetermined operational mode.

EXAMPLES

Example 1 is a building control system for controlling one or more building components that service a building including: a discrete air conditioner controller configured to communicate with and control one or more discrete air conditioner units servicing the building, the discrete air conditioner controller including a memory and a controller located within a housing, the memory storing a programmable operating schedule for operating the one or more discrete air conditioner units, wherein the programmable operating schedule includes two or more time periods, and each time period includes a corresponding programmable temperature set point, the controller configured to send out one or more commands to the one or more discrete air conditioner units in accordance with the programmable operating schedule stored in the memory; and a central coordinator having a user interface, a memory, and a controller, wherein the controller of the central coordinator is configured to accept one or more parameters of the programmable operating schedule from a user via the user interface of the central coordinator, and to send at least a portion of the programmable operating schedule, including one or more parameters accepted from a user, to the discrete air conditioner controller, wherein at least a portion of the programmable operating schedule sent to the discrete air conditioner controller is stored in the memory of the discrete air conditioner controller.

Example 2 includes the building control system according to example 1, wherein the discrete air conditioner controller includes a first wireless interface and a second wireless interface, wherein the central controller sends at least a portion of the programmable operating schedule via the first wireless interface, and the discrete air conditioner controller sends out one or more commands to the one or more discrete air conditioner units via the second wireless interface.

Example 3 includes the building control system according to any one of examples 1 or 2, wherein the first wireless interface includes a radio frequency (RF) wireless interface, and the second wireless interface includes an Infrared (IR) wireless interface.

Example 4 includes the building control system according to any one of examples 1-3, wherein the discrete air conditioner controller includes an occupancy sensor, and the controller of the discrete air conditioner controller sends an indication of occupancy to the central coordinator via the first wireless interface.

Example 5 includes the building control system according to any one of examples 1-4, wherein the controller of the central coordinator displays in indication of occupancy on the user interface of the central coordinator.

Example 6 includes the building control system according to any one of examples 1-5, wherein the controller of the central coordinator sends one or more signals to a lighting controller based on the indication of occupancy received from the discrete air conditioner controller.

Example 7 includes the building control system according to any one of examples 1-6, wherein the discrete air conditioner controller includes a temperature sensor, and the controller of the discrete air conditioner controller sends an indication of temperature to the central coordinator via the first wireless interface.

Example 8 includes the building control system according to any one of examples 1-7, wherein the controller of the central coordinator displays in indication of temperature on the user interface of the central coordinator.

Example 9 includes the building control system according to any one of examples 1-8, wherein the user interface, the memory, and the controller of the central coordinator are all within a common housing.

Example 10 includes the building control system according to any one of examples 1-9, wherein the memory and the controller of the central coordinator are within a common housing, and the user interface is remote from the common housing.

Example 11 includes the building control system according to any one of examples 1-10, wherein user interface is part of a remote device that is located remotely from the common housing.

Example 12 includes the building control system according to any one of examples 1-11, wherein the remote device is a portable computing device, a smart phone, a tablet computer, a lap top computer, or a desktop computer.

Example 13 includes the building control system according to any one of examples 1-12, wherein the first wireless interface is a WiFi interface and the second wireless interface is a mesh wireless interface.

Example 14 includes the building control system according to any one of examples 1-13, further comprising a discrete air conditioner unit for servicing the building configured to receive one or more commands from the discrete air conditioner controller.

Example 15 includes the building control system according to any one of examples 1-14, further comprising a current sensor unit operatively coupled the discrete air conditioner unit to monitor current drawn by the discrete air conditioner unit, wherein the current sensor unit is configured to send a signal indicative of the current drawn to the central coordinator.

Example 16 includes the building control system according to any one of examples 1-15, wherein the central coordinator uses the signal indicative of the current drawn to confirm that the one or more commands sent to the discrete air conditioner unit was actually received by the discrete air conditioner unit.

Example 17 includes the building control system according to any one of examples 1-16, further comprising one or more lighting banks having at least one light, wherein the one or more lighting banks are configured to receive a command from the central coordinator for operating the at least one light.

Example 18 includes the building control system according to any one of examples 1-17, wherein the controller of the discrete air conditioner controller is configured to learn one or more codes for controlling one or more discrete air conditioner units by receiving one or more infrared signals via a wireless interface, and to store the one or more codes in the memory of the discrete air conditioner controller.

Example 19 is a building control system for controlling one or more building components that service a building including: a central coordinator including an input/output port for sending and/or receiving one or more signals over a wireless network, a user interface for accepting one or more interactions from a user, and a controller coupled to the input/output port, the user interface and the memory; a discrete air conditioner controller configured to communicate with and control one or more discrete air conditioner units that service the building, the discrete air conditioner controller including a wireless I/O block for receiving signals in a first signal format from the central coordinator and for transmitting signals to the one or more discrete air conditioner units in a second signal format, a memory, and a controller coupled to the wireless I/O block and the memory, the controller of the discrete air conditioner controller configured to wirelessly transmit a signal for controlling at least one discrete air conditioner unit in response to receiving a signal from the central coordinator; and the discrete air conditioner controller including one or more of a temperature sensor and an occupancy sensor.

Example 20 includes the building control system according to example 19, wherein the wireless I/O block includes a wireless radio frequency (RF) interface and a wireless infrared (IR) interface.

Example 21 includes the system according to examples 19 or 20, wherein the central coordinator is configured to send a signal to the discrete air conditioner controller for controlling the one or more discrete air conditioner units in response to a signal indicative of a sensed parameter received from the temperature sensor and/or the occupancy sensor.

Example 22 is a method of controlling a discrete air conditioner unit that is servicing a building including the steps of: receiving a signal indicative of a sensed parameter at a central coordinator; transmitting a command having a first signal format from the central coordinator to a discrete air conditioner controller located near a discrete air conditioner unit mounted in a ceiling, a wall or a window of the building; and in response to receiving the transmitted command, transmitting a command having a second signal format from the discrete air conditioner controller to the discrete air conditioner unit for controlling operation of the discrete air conditioner controller, wherein the first signal format is different from the second signal format.

Example 23 includes the method of example 22 and further comprises the steps of: transmitting an operating schedule for the discrete air conditioner unit in a first signal format from the central coordinator to the discrete air conditioner controller; storing the operating schedule in a memory of the discrete air conditioner controller; and sending a command signal in a second signal format from the discrete air conditioner controller to the discrete air conditioner unit in accordance with the operating schedule that is stored in the memory.

Example 24 includes the method according to examples 22 or example 23, further comprising receiving an updated operating schedule at the discrete air conditioner controller, the discrete air conditioner controller overwriting at least a portion of the operating schedule stored in the memory with the updated operating schedule.

Example 25 is a building control system for controlling one or more building components that service a building including: a central coordinator having an input/output port for wirelessly sending and receiving one or more signals to and from at least one building component located within the building, a memory, and a controller coupled to the input/output port and the memory; a discrete air conditioner control unit configured to communicate with and control one or more remotely controllable discrete air conditioner units servicing the building, each of the one or more remotely controllable discrete air conditioner units being wirelessly controllable via an associated handheld remote control; the discrete air conditioner control unit having a first wireless interface for sending and receiving signals to and from the central coordinator; the discrete air conditioner controller having a second wireless interface for transmitting control commands to the one or more discrete air conditioner units; the discrete air conditioner control unit further configured to accept at least one control command codes via the second wireless interface from a handheld remote control unit associated with at least one of the remotely controllable discrete air conditioner units, and to use the at least one control command codes when transmitting one or more control commands to the one or more discrete air conditioner units; and the discrete air conditioner control unit further configured to transmit the at least one control command codes to the central coordinator via the first wireless interface, wherein the central coordinator is configured to store the at least one control command codes in the memory of the central coordinator.

Example 26 includes the system according to example 25, wherein the central coordinator is configured to retrieve and reproduce at least one of the control command codes previously stored in the memory, and to transmit the reproduced control command codes to the discrete air conditioner controller for use in controlling a discrete air conditioner unit.

Example 27 includes the system according to examples 25 or 26, wherein the first wireless interface is a mesh network interface, and the second wireless interface is an infrared interface.

Example 28 includes the system according to any one of examples 25-27, the central coordinator includes a control command code database that stores a plurality of control command codes that correspond to a plurality of different discrete air conditioner unit types.

Example 29 includes the system according to any one of examples 25-28, wherein the discrete air conditioner control unit accepts via the second wireless interface at least one control command code as a raw waveform.

Example 30 includes the system according to any one of examples 25-29, wherein the raw waveform is not decoded before being stored in a memory of the discrete air conditioner control unit.

Example 31 includes the system according to any one of examples 25-30, wherein the raw waveform is an infrared wave form.

Example 32 includes the system according to any one of examples 25-31, further comprising a current sensor unit coupled to a discrete air conditioner unit, the current sensor unit configured to transmit a signal indicative of a change in current draw of the discrete air conditioner unit.

Example 33 is an air conditioner control unit for controlling one or more discrete air conditioner units located within a building including: a first wireless interface for sending and receiving signals to and from a central coordinator; a second wireless interface for transmitting control commands to the one or more discrete air conditioner units, the first wireless interface using a different communication protocol than the second wireless interface; a memory; a controller coupled to the first wireless interface and the second wireless interface, the controller configured to accept a first set of infrared codes via the second wireless interface for use in controlling a discrete air conditioner unit from a handheld remote control that is associated with the discrete air conditioner unit, and store the first set of infrared codes into the memory; and the controller configured to receive one or more commands from the central controller via the first wireless interface, and based on the one or more received commands, select an appropriate one or more of the first set of infrared codes from the memory, and transmit the selected one or more of the first set of infrared codes to the discrete air conditioner unit via the second wireless interface to control the discrete air conditioner unit.

Example 34 includes the air conditioner control unit according to example 33, wherein the first set of infrared codes are accepted by the second wireless interface and then stored as raw infrared waveforms in the memory.

Example 35 includes the air conditioner control unit according to examples 33 or 34, wherein the controller does not decode the first set of infrared codes before storing them in the memory.

Example 36 includes the air conditioner control unit according to any one of examples 33-35, wherein the controller is further configured to transmit the first set of infrared codes to the central coordinator via the first wireless interface for subsequent use by other air conditioner control units.

Example 37 is a method of controlling one or more discrete air conditioner units that service a building including the steps of: wirelessly receiving at least one IR code for controlling a discrete air conditioner unit from a handheld remote control that is associated with the discrete air conditioner unit, the IR code received as a raw waveform; storing the raw waveform of the at least one code in a memory; associating the raw waveform of the at least one code with a discrete air conditioner unit type, and storing the association; transmitting the raw waveform of the at least one code, and the association, to a central coordinator; and storing the raw waveform of the at least one code in a memory of the central coordinator.

Example 38 includes the method according to example 37 and further comprises: retrieving the raw waveform of the at least one code from the memory of the central coordinator; and transmitting the raw waveform of the at least one code to a discrete air conditioner controller for controlling a discrete air conditioner unit.

Example 39 includes the method according to examples 37 or 38 and further comprises transmitting the raw waveform of the at least one code to the discrete air conditioner controller in response to a signal received from a user interface of the central coordinator indicating a parameter change.

Example 40 includes the method according to any one of examples 37-39, and further comprises: transmitting the raw waveform of the at least one code to a discrete air conditioner unit to effect a change in operation of the discrete air conditioner unit; receiving a signal from a current sensor associated with the discrete air conditioner unit; and confirming successful receipt of the raw waveform of the at least one code at the discrete air conditioner unit by noting a corresponding change in the signal received from the current sensor.

Example 41 includes the method according to any one of examples 37-40 and, further comprises: transmitting the raw waveform of the at least one code to a discrete air conditioner unit to effect a change in operation of the discrete air conditioner unit; and receiving an auditory signal from the discrete air conditioner unit confirming successful receipt of the raw waveform of the at least one code at the discrete air conditioner unit.

Example 42 includes the method according to any one of examples 37-41, and further comprises: transmitting the raw waveform of the at least one code to a discrete air conditioner unit to effect a change in operation of the discrete air conditioner unit; and receiving a visual signal from the discrete air conditioner unit confirming successful receipt of the raw waveform of the at least one code at the discrete air conditioner unit.

Example 43 includes the method according to any one of examples 37-42, wherein the visual signal includes a two-dimensional image of a display of the discrete air conditioner unit.

Example 44 includes the method according to any one of examples 37-43 and, further comprises: transmitting the raw waveform of the at least one code to a discrete air conditioner unit to effect a change in operation of the discrete air conditioner unit; and receiving an IR signal from the discrete air conditioner unit confirming successful receipt of the raw waveform of the at least one code at the discrete air conditioner unit.

Example 45 is a controller unit for controlling a discrete air conditioning unit mounted to a wall, ceiling or window of a building including: a housing including one or more features to aid in mounting the controller unit to a surface of the building; a memory located within the housing for storing a programmable operating schedule for a discrete air conditioning unit, wherein the programmable operating schedule includes two or more time periods, and each time period includes a corresponding programmable temperature set point; a first wireless interface for communicating with a remotely located central coordinator; a second wireless interface for communicating with the discrete air conditioning unit, the first wireless interface using a different communication protocol than the second wireless interface; a temperature sensor; and a controller located within the housing and coupled to the memory, the first wireless interface, the second wireless interface, and the temperature sensor, the controller configured to send out a command to the discrete air conditioning unit via the second wireless interface in accordance with the programmable operating schedule stored in the memory, the controller also configured to receive one or more schedule updates to the programmable operating schedule via the first wireless interface.

Example 46 includes the controller unit according to example 45, further comprising an occupancy sensor.

Example 47 includes the controller unit according to examples 45 or 46, wherein the second wireless interface is an infrared wireless interface.

Example 48 includes the controller unit according to any one of examples 45-47, wherein the first wireless interface is a mesh wireless network interface.

Example 49 includes the controller unit according to any one of examples 45-48, wherein the first wireless interface is an ad hoc wireless network interface.

Example 50 includes the controller unit according to any one of examples 45-49, wherein the first wireless interface is a wifi wireless network interface.

Example 51 includes the controller unit according to any one of examples 45-50, wherein the controller is further configured to transmit a signal indicative of a temperature sensed by the temperature sensor via the first wireless interface.

Example 52 includes the controller unit according to any one of examples 45-51, wherein the controller unit is battery powered.

Example 53 includes the controller unit according to any one of examples 45-52, wherein the controller is powered by a line voltage with battery backup.

Example 54 is a controller unit for controlling a discrete air conditioning unit mounted in a wall, ceiling or window of a building including: a housing; a first wireless interface for communicating with a remotely located central coordinator; a second wireless interface for communicating with the discrete air conditioning unit, the first wireless interface using a different communication protocol than the second wireless interface; a memory for storing one or more operating parameters including a temperature set point; a temperature sensor for sensing a temperature in or around the housing; and a controller located within the housing and coupled to the first wireless interface, the second wireless interface, the memory and the temperature sensor, the controller configured to send out one or more commands to the discrete air conditioning unit via the second wireless interface in an attempt to control the temperature sensed by the temperature sensor in accordance with the temperature set point stored in the memory, the controller further configured to receive one or more set point updates via the first wireless interface, and to store the one or more set point updates in the memory.

Example 55 includes the controller unit according to example 54 wherein the first wireless interface is a radio frequency (RF) wireless interface for sending and/or receiving RF signals, and the second wireless interface is an infrared (IR) wireless interface for sending and/or receiving IR signals.

Example 56 includes the controller unit according to examples 54 or 55, wherein after a set point update is received via the first wireless interface, the controller is configured to send out one or more commands to the discrete air conditioning unit via the second wireless interface in an attempt to control the temperature sensed by the temperature sensor in accordance with the updated temperature set point.

Example 57 includes the controller unit according to any one of examples 54-56, further comprising an occupancy sensor for providing an indication of occupancy.

Example 58 includes the controller unit according to any one of examples 54-57, wherein the memory includes a first temperature set point for when occupancy is detected by the occupancy detector and a second temperature set point for when occupancy is not detected by the occupancy detector; the controller is configured to send out one or more commands to the discrete air conditioning unit via the second wireless interface in an attempt to control the temperature sensed by the temperature sensor in accordance with the first temperature set point stored in the memory when the occupancy detector indicates occupancy; and the controller is configured to send out one or more commands to the discrete air conditioning unit via the second wireless interface in an attempt to control the temperature sensed by the temperature sensor in accordance with the second temperature set point stored in the memory when the occupancy detector does not indicate occupancy.

Example 59 includes the controller unit according to any one of examples 54-58, wherein the memory stores a programmable operating schedule for the discrete air conditioning unit, wherein the programmable operating schedule includes two or more time periods, and each time period includes a corresponding programmable temperature set point; and wherein the controller is configured to send out a command to the discrete air conditioning unit via the second wireless interface in accordance with the programmable operating schedule stored in the memory.

Example 60 includes the controller unit according to any one of examples 54-59, wherein the controller is configured to receive one or more schedule updates to the programmable operating schedule via the first wireless interface.

Example 61 includes the controller according to any one of examples 54-60, wherein the controller is battery powered.

Example 62 is a method of controlling a discrete air conditioner unit servicing a building or structure including the steps of: receiving an operating schedule for the discrete air conditioner unit in a first signal format at a discrete air conditioner controller unit via a first wireless interface of the discrete air conditioner controller unit, the discrete air conditioner controller unit having a memory and controller coupled to the memory, the memory and the controller located within a housing that is mountable to a surface of the building or structure, the discrete air conditioner controller unit configured to control the discrete air conditioner unit from a remote location via a second wireless interface in accordance with the operating schedule stored in the memory; storing the received operating schedule in the memory of the discrete air conditioner controller unit; and sending one or more commands in a second signal format from the discrete air conditioner controller unit to the discrete air conditioner unit via the second wireless interface in accordance with the received operating schedule stored in the memory of the discrete air conditioner controller unit.

Example 63 includes the method according to example 62, and further comprises detecting occupancy within the building or structure, and if occupancy is detected, sending one or more commands in the second signal format from the discrete air conditioner controller unit to the discrete air conditioner unit via the second wireless interface in accordance with an occupied temperature set point, and if occupancy is not detected, sending one or more commands in the second signal format from the discrete air conditioner controller unit to the discrete air conditioner unit via the second wireless interface in accordance with an unoccupied temperature set point.

Example 64 includes the method of examples 62 or 63, wherein the operating schedule includes one or both of occupied temperature set points and unoccupied temperature set points.

Example 65 is a building control system for controlling one or more building components that service a building including: a central coordinator comprising an wireless interface for wirelessly sending and receiving one or more wireless signals, a user interface for accepting one or more user interactions from a user, and a controller coupled to the input/output port, the user interface and the memory, the central coordinator is powered by a line voltage; a discrete air conditioner controller configured to communicate with and control one or more discrete air conditioner units that service a building, the discrete air conditioner controller including a first wireless interface for wirelessly communicating with the central coordinator via a mesh network, and a second wireless interface for communicating with one or more discrete air conditioner units, the second wireless interface includes an infrared (IR) interface for transmitting IR control codes to the one or more discrete air conditioner units, the discrete air conditioner controller is powered by a battery; the discrete air conditioner controller further includes one or more sensors, wherein the one or more sensors include one or more of a temperature sensor, an occupancy sensor, a humidity sensor and a light sensor; and wherein the discrete air conditioner controller is configured to transition between a sleep mode in which less power is consumed and an active mode in which more power is consumed, wherein in the active mode the discrete air conditioner controller is configured to transmit over the mesh network, and wherein in the sleep mode the discrete air conditioner controller is configured to not transmit over the mesh network.

Example 66 includes the building control system according to example 65, wherein the discrete air conditioner controller is configured to communicate a measure related to a parameter sensed by the one or more sensors to the central coordinator via the first wireless interface when the discrete air conditioner controller is in the active mode.

Example 67 includes the building control system according to examples 65 or 66, wherein the discrete air conditioner controller is configured to transition between the sleep mode and the active mode according to a schedule.

Example 68 includes the building control system according to any one of examples 65-67, wherein the schedule is communicated from the central coordinator to the discrete air conditioner controller via the mesh network.

Example 69 includes the building control system according to any one of examples 65-68, wherein the discrete air conditioner controller is configured to transition between the sleep mode and the active mode in accordance with a beacon signal received from the central coordinator.

Example 70 is a discrete air conditioner controller for communicating with and controlling one or more discrete air conditioner units that service a building, the discrete air conditioner controller operating in conjunction with a central coordinator that has a wireless interface for wirelessly sending and receiving one or more wireless signals, a user interface for accepting one or more user interactions from a user, and a controller coupled to the input/output port, the user interface and the memory, the discrete air conditioner controller having a housing that houses: a first wireless interface for wirelessly communicating with the central coordinator via a first network; a second wireless interface for communicating with the one or more discrete air conditioner units, the second wireless interface using a different communications protocol than the first wireless interface; at least one sensor, wherein the at least one sensor includes one or more of a temperature sensor, an occupancy sensor, a humidity sensor and a light sensor; a controller configured to transition the discrete air conditioner controller between a sleep mode in which less power is consumed and an active mode in which more power is consumed, and wherein in the active mode the discrete air conditioner controller is configured to communicate over the first network, and in the sleep mode the discrete air conditioner controller is configured to not communicate over the first network; and a battery holder for holding a battery for powering the discrete air conditioner controller.

Example 71 includes the discrete air conditioner controller according to example 70, wherein the second wireless interface includes in infrared (IR) interface.

Example 72 includes the discrete air conditioner controller according to examples 70 or 71, wherein the at least one sensor is inactive when the discrete air conditioner controller is in the sleep mode.

Example 73 includes the discrete air conditioner controller according to any one of examples 70-72, wherein the discrete air conditioner controller is configured to communicate a measure related to a parameter sensed by the at least one sensor to the central coordinator via the first wireless interface when the discrete air conditioner controller is in the active mode.

Example 74 includes the discrete air conditioner controller according to any one of examples 70-73, wherein the discrete air conditioner controller is configured to switch from the sleep mode to the active mode when a measure related to a parameter sensed by the at least one sensor meets one or more predetermined criteria.

Example 75 includes the discrete air conditioner controller according to any one of examples 70-74, wherein the discrete air conditioner controller is configured to initiate a communication with one or more discrete air conditioner units when a measure related to a parameter sensed by the at least one sensor meets one or more predetermined criteria.

Example 76 includes the discrete air conditioner controller according to any one of examples 70-75, wherein the discrete air conditioner controller is configured to transition between the sleep mode and the active mode according to a schedule.

Example 77 includes the discrete air conditioner controller according to any one of examples 70-76, wherein the schedule is communicated from the central coordinator to the discrete air conditioner controller via the first network.

Example 78 includes the discrete air conditioner controller according to any one of examples 70-77, wherein the duration of the active mode is dynamically updated according to one or more of density of nodes on the first network and the expected traffic on the first network.

Example 79 includes the discrete air conditioner controller according to any one of examples 70-78, wherein the discrete air conditioner controller is configured to transition between the sleep mode and the active mode in accordance with a beacon signal received from the central coordinator.

Example 80 includes the discrete air conditioner controller according to any one of examples 70-79, wherein the discrete air conditioner controller is configured to transition from the sleep mode to the active mode a predetermined delay after receiving a beacon signal from the central coordinator.

Example 81 includes the discrete air conditioner controller according to any one of examples 70-80, wherein the discrete air conditioner controller remains in the active mode for a duration that is dynamically set by the beacon signal.

Example 82 includes the discrete air conditioner controller according to any one of examples 70-81, wherein the discrete air conditioner controller is configured to remain in a pre-sleep state when in the sleep mode, such that when the discrete air conditioner controller subsequently transition to the active mode, the discrete air conditioner controller continues to execute from the pre-sleep state.

Example 83 includes the discrete air conditioner controller according to any one of examples 70-82, wherein the discrete air conditioner controller is configured to transmit data to the central coordinator according to a predetermined schedule, wherein the discrete air conditioner controller transition from the sleep mode to the active mode in accordance with the predetermined schedule, wherein the discrete air conditioner controller is configured to return to the passive mode after the data has been transmitted to the central coordinator.

Example 84 includes the discrete air conditioner controller according to any one of examples 70-83, further comprising at least one lighting controller for controlling one or more light banks each having at least one light.

Example 85 is a method of controlling a discrete air conditioner unit that services a building including the steps of: transmitting a command over a first wireless communications path from a central coordinator to a discrete air conditioner controller located near a discrete air conditioner unit mounted on a ceiling, a wall or a window of the building; in response to receiving the command over the first wireless communications path, transmitting a command over a second wireless communications path from the discrete air conditioner controller to the discrete air conditioner unit for controlling operation of the discrete air conditioner controller, wherein the first wireless communications path is not compatible with the second wireless communications path; sensing one or more sensed parameters at the discrete air conditioner controller, and if the one or more sensed parameters meet one or more predetermined criteria, transmitting one or more commands over a second wireless communications path from the discrete air conditioner controller to the discrete air conditioner unit for controlling operation of the discrete air conditioner controller; transitioning the discrete air conditioner controller between a sleep mode in which less power is consumed and an active mode in which more power is consumed, wherein in the active mode the discrete air conditioner controller is configured to transmit data to the central coordinator via the first wireless communications path, and wherein in the sleep mode the discrete air conditioner controller is configured to not transmit data over the first wireless communications path.

Example 86 is an apparatus for detecting an operational mode of a building component of an environmental control system including: a sensor for outputting a signal related to a measure of power drawn by the building component; a signal conditioning circuit coupled to the sensor, the signal conditioning circuit for conditioning the signal received from the sensor; a comparator coupled to the signal conditioning circuit, the comparator for comparing the conditioned signal to a specified threshold associated with an ON condition of the building component; and a wireless interface configured to wirelessly transmit a determination of whether the building component is ON or OFF based on a result determined by the comparator.

Example 87 includes the apparatus of example 86, wherein the sensor includes a split core current sensor wherein the split core current sensor is coupled around at least one conductor of a power cord of the building component.

Example 88 includes the apparatus of examples 86 or 87, wherein the signal conditioning circuit conditions the signal received from the sensor by amplifying and/or filtering.

Example 89 includes the apparatus according to any one of examples 86-88, wherein the comparator compares the conditioned signal to two or more specified thresholds, wherein a first threshold corresponds to a first operational mode of the building component, and a second threshold corresponds to a second operational mode of the building component, and wherein both the first operational mode and the second operational mode correspond to operational modes when the building component is ON.

Example 90 includes the apparatus according to any one of examples 85-89, wherein the first threshold and the second threshold are configurable.

Example 91 includes the apparatus according to any one of examples 85-90, wherein the building component is an air conditioner, and wherein the first threshold corresponds to an operational mode indicating that a fan is ON, and the second threshold corresponds to an operational mode indicating that both a compressor and the fan are ON.

Example 92 includes the apparatus according to any one of examples 85-91, wherein the building component is an air conditioner, and the apparatus determines the operational mode of the building component in response to a message received at the wireless interface sent by a discrete air conditioner controller.

Example 93 includes the apparatus according to any one of examples 85-92, further comprising a timer circuit, wherein the apparatus transmits the determined operational mode of the building component via the wireless interface after a specified duration that is timed by the timer circuit.

Example 94 includes the apparatus according to any one of examples 85-93, further comprising a controller and a memory for storing information about one or more different air conditioner models, wherein the controller is configured to determine the specified threshold using the information about the one or more different air conditioner models.

Example 95 includes the apparatus according to any one of examples 85-94, wherein the controller is further configured to determine a duty cycle of the air conditioner.

Example 96 is a building control system for controlling one or more building components located within a building including: an air conditioner coupled to a power source; a discrete air conditioner controller configured to communicate with and control one or more discrete air conditioner units located within the building via a first wireless communications path, the discrete air conditioner controller comprising a memory and a controller located within a housing, the memory storing an operating schedule for operating the one or more discrete air conditioner units and the controller configured to send out one or more commands to the one or more discrete air conditioner units in accordance with the operating schedule stored in the memory; a central coordinator comprising a user interface, a memory, and a controller, the controller of the central coordinator configured to receive and accept an operating schedule from a user via the user interface and to send at least a portion of the operating schedule to the discrete air conditioner controller via a second wireless communications path, wherein at least a portion of the operating schedule is stored in the memory of the discrete air conditioner controller; and an operational mode sensor associated with the air conditioner including a current sensor for outputting a signal related to a measure of power drawn by the building component, a signal conditioning circuit coupled to the current sensor, the signal conditioning circuit for conditioning the signal received from the current sensor, a comparator coupled to the signal conditioning circuit, the comparator for comparing the conditioned signal to a specified threshold associated with an ON condition of the building component, and a wireless interface configured to communicate a determination of whether the building component is ON or OFF based on a result determined by the comparator.

Example 97 includes the building control system of example 96, wherein the current sensor is a split core current sensor wherein the current sensor is coupled around at least one conductor of a power cord of the air conditioner.

Example 98 includes the building control system according to examples 96 or 97, wherein the signal conditioning circuit conditions the signal received from the current sensor by amplifying and/or filtering.

Example 99 includes the building control system according to any one of examples 96-98, wherein the comparator compares the conditioned signal to two or more specified thresholds, wherein a first threshold corresponds to a first operational mode of the air conditioner, and a second threshold corresponds to a second operational mode of the air conditioner, and wherein the first operational mode and the second operational mode both correspond to operational modes when the air conditioner is ON.

Example 100 includes the building control system according to any one of examples 96-99, wherein the first threshold and the second threshold are configurable.

Example 101 includes the building control system according to any one of examples 96-100, wherein the first threshold corresponds to an operational mode indicating that a fan of the air conditioner is ON, and the second threshold corresponds to an operational mode indicating that a compressor and the fan of the air conditioner are ON.

Example 102 is a method of confirming that one or more commands that were wirelessly sent to a building component of a building were received and implemented including the steps of: wirelessly sending one or more commands to a building component of a building, the one or more commands configured to change an operational mode of the building component to a predetermined operational mode; sensing a measure of power consumed by the building component; comparing the measure of power consumed by the building component to a specified threshold associated with the predetermined operational mode of the building component, and based on the comparison, determining whether the building component is in the predetermined operational mode; wirelessly sending one or more messages that indicate whether the building component is in the predetermined operational mode; and if the building component is in the predetermined operational mode, confirming that the one or more commands were received and implemented by the building component.

Example 103 includes the method according to example 102, and further comprises configuring the specified threshold based on a building component type.

Example 104 includes the method according to examples 102 or 103, wherein the building component is an air conditioner unit.

Example 105 includes the method according to any one of examples 102-104, wherein the predetermined operational mode corresponds to an ON mode as opposed to an OFF mode.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. An apparatus comprising:
    a remote control unit;
    a building component;
    wherein the building component is configured to receive wireless control commands from the remote control unit but the building component is incapable of transmitting its operational status in response to a received wireless control command from the remote control unit;
    a sensing module comprising:
        a sensor for outputting a signal related to a measure of power drawn by the building component;
        a signal conditioning circuit coupled to the sensor, the signal conditioning circuit for conditioning the signal received from the sensor;
        a comparator coupled to the signal conditioning circuit, the comparator for comparing the conditioned signal to a specified threshold associated with an ON condition of the building component;
        a wireless interface configured to wirelessly transmit a determination of whether the building component is ON or OFF based on a result determined by the comparator; and
    wherein the remote control unit is configured to receive from the wireless interface of the sensing unit the determination of whether the building component is ON or OFF, and to use the determination to confirm whether or not the building component received a wireless control command transmitted to the building component by the remote control unit.

2. The apparatus of claim 1, wherein the sensor of the sensor unit includes a split core current sensor wherein the split core current sensor is coupled around at least one conductor of a power cord of the building component.

3. The apparatus of claim 1, wherein the signal conditioning circuit of the sensor unit conditions the signal received from the sensor by amplifying and/or filtering.

4. The apparatus of claim 1, wherein the comparator of the sensor unit compares the conditioned signal to two or more specified thresholds, wherein a first threshold corresponds to a first operational mode of the building component, and a second threshold corresponds to a second operational mode of the building component, and wherein both the first operational mode and the second operational mode correspond to operational modes when the building component is ON.

5. The apparatus of claim 4, wherein the first threshold and the second threshold are configurable.

6. The apparatus of claim 4, wherein the building component is an air conditioner, and wherein the first threshold corresponds to an operational mode indicating that a fan is ON, and the second threshold corresponds to an operational mode indicating that both a compressor and the fan are ON.

7. The apparatus of claim 1, wherein the building component is an air conditioner, and the apparatus determines the operational mode of the building component in response to a message received at the wireless interface of the sensor unit sent by the remote control unit.

8. The apparatus of claim 7, further comprising a timer circuit, wherein the apparatus transmits the determined operational mode of the building component via the wireless interface after a specified duration that is timed by the timer circuit.

9. The apparatus of claim 7, further comprising a controller and a memory for storing information about one or more different air conditioner models, wherein the controller is configured to determine the specified threshold using the information about the one or more different air conditioner models.

10. The apparatus of claim 7, wherein the controller is further configured to determine a duty cycle of the air conditioner.

11. A building control system for controlling one or more building components located within a building including at least one discrete air conditioner unit, the building control system comprising:
    a discrete air conditioner unit coupled to a power source;
    a discrete air conditioner controller configured to communicate with and control the discrete air conditioner unit via one or more commands transmitted to the discrete air conditioner unit via a first wireless communications path, the discrete air conditioner controller comprising a memory and a controller located within a housing, the memory storing an operating schedule for operating the discrete air conditioner unit and the controller configured to send out one or more commands to the discrete air conditioner unit in accordance with the operating schedule stored in the memory;

a central coordinator comprising a user interface, a memory, and a controller, the controller of the central coordinator configured to receive and accept an operating schedule from a user via the user interface and to send at least a portion of the operating schedule to the discrete air conditioner controller via a second wireless communications path, wherein at least a portion of the operating schedule is stored in the memory of the discrete air conditioner controller; and an operational mode sensor associated with the air conditioner, the operational mode sensor comprising:
a current sensor for outputting a signal related to a measure of power drawn by the discrete air conditioner unit;
a signal conditioning circuit coupled to the current sensor, the signal conditioning circuit for conditioning the signal received from the current sensor;
a comparator coupled to the signal conditioning circuit, the comparator for comparing the conditioned signal to a specified threshold associated with an ON condition of the discrete air conditioner unit; and
a wireless interface configured to communicate a determination of whether the discrete air conditioner unit is ON or OFF based on a result determined by the comparator; and
wherein the discrete air conditioner controller confirms whether the discrete air conditioner unit received the commands from the discrete air conditioner controller based at least in part on the determination of whether the discrete air conditioner unit is ON or OFF.

12. The building control system of claim 11, wherein the current sensor is a split core current sensor wherein the current sensor of the operational mode sensor is coupled around at least one conductor of a power cord of the discrete air conditioner unit.

13. The building control system of claim 11, wherein the signal conditioning circuit of the operational mode sensor conditions the signal received from the current sensor by amplifying and/or filtering.

14. The building control system of claim 11, wherein the comparator of the operational mode sensor compares the conditioned signal to two or more specified thresholds, wherein a first threshold corresponds to a first operational mode of the discrete air conditioner unit, and a second threshold corresponds to a second operational mode of the discrete air conditioner unit, and wherein the first operational mode and the second operational mode both correspond to operational modes when the air conditioner is ON.

15. The building control system of claim 14, wherein the first threshold and the second threshold are configurable.

16. The building control system of claim 14, wherein the first threshold corresponds to an operational mode indicating that a fan of the air conditioner is ON, and the second threshold corresponds to an operational mode indicating that a compressor and the fan of the discrete air conditioner unit are ON.

17. A method of confirming that one or more commands that were wirelessly sent to a building component of a building were received and implemented, wherein the building component is configured to receive the one or more commands from a remote control unit but is incapable of transmitting confirmation that the one or more commands were received and implemented in response receiving the one or more commands from the remote control unit, the method comprising:
wirelessly sending the one or more commands to the building component of the building, the one or more commands configured to change an operational mode of the building component to a predetermined operational mode;
sensing a measure of power consumed by the building component;
comparing the measure of power consumed by the building component to a specified threshold associated with the predetermined operational mode of the building component, and based on the comparison, determining whether the building component is in the predetermined operational mode;
wirelessly sending one or more messages that indicate whether the building component is in the predetermined operational mode; and
confirming that the one or more commands were received and implemented by the building component with the building component in the predetermined operational mode, and using the confirmation in subsequently controlling the building component.

18. The method of claim 17, further comprising:
configuring the specified threshold based on a building component type.

19. The method of claim 17, wherein the building component is an air conditioner unit.

20. The method of claim 17, wherein the predetermined operational mode corresponds to an ON mode as opposed to an OFF mode.

* * * * *